(12) United States Patent
Papsdorf

(10) Patent No.: US 11,655,579 B2
(45) Date of Patent: *May 23, 2023

(54) DYNAMIC BALANCING ASSEMBLIES AND LAUNDRY APPARATUSES HAVING ONE OR MORE CLOCKSPRINGS

(71) Applicant: The Procter & Gamble Company, Cincinnati, OH (US)

(72) Inventor: Clifford Theodore Papsdorf, Loveland, OH (US)

(73) Assignee: The Procter & Gamble Company, Cincinnati, OH (US)

(*) Notice: Subject to any disclaimer, the term of this patent is extended or adjusted under 35 U.S.C. 154(b) by 173 days.

This patent is subject to a terminal disclaimer.

(21) Appl. No.: 17/172,466

(22) Filed: Feb. 10, 2021

(65) Prior Publication Data

US 2021/0246594 A1    Aug. 12, 2021

(30) Foreign Application Priority Data

Feb. 10, 2020   (EP) .................................... 20156327

(51) Int. Cl.
*D06F 37/22*   (2006.01)
*D06F 33/48*   (2020.01)
(Continued)

(52) U.S. Cl.
CPC .............. *D06F 37/22* (2013.01); *D06F 23/02* (2013.01); *D06F 33/48* (2020.02); *D06F 34/16* (2020.02);
(Continued)

(58) Field of Classification Search
CPC .......... D06F 33/48; D06F 33/76; D06F 34/16; D06F 37/22; D06F 37/225; D06F 37/24;
(Continued)

(56) References Cited

U.S. PATENT DOCUMENTS 3,080,059 A   3/1963 Scott et al.
3,190,447 A   6/1965 Scott et al.
(Continued)

FOREIGN PATENT DOCUMENTS

EP   0997568 A1   5/2000
GB    598086 A    2/1948
(Continued)

OTHER PUBLICATIONS

"Clockspring," Wikipedia (https://en.wikipedia.org/wiki/Clockspring); archived at Wayback Machine (http://web.archive.org/web/20150420064138/https://en.wikipedia.org/wiki/Clockspring), Apr. 20, 2015. (Year: 2015).*
(Continued)

*Primary Examiner* — David G Cormier
(74) *Attorney, Agent, or Firm* — Gary J. Foose

(57) ABSTRACT

A dynamic balancing assembly for a laundry apparatus includes a control unit, one or more counterweight devices, and one or more clocksprings. The one or more counterweight devices are configured to be orbited about a primary rotation axis of the laundry apparatus to counteract a load imbalance in a drum of the laundry apparatus. The one or more clocksprings communicatively couple each of the one or more counterweight devices to the control unit.

17 Claims, 16 Drawing Sheets

(51) Int. Cl.
  *D06F 34/16*   (2020.01)
  *D06F 23/02*   (2006.01)
  *F16F 15/36*   (2006.01)
  *D06F 103/26*  (2020.01)

(52) U.S. Cl.
  CPC .......... *F16F 15/36* (2013.01); *D06F 2103/26* (2020.02); *F16F 2222/08* (2013.01); *F16F 2230/0011* (2013.01); *F16F 2230/08* (2013.01); *F16F 2230/18* (2013.01); *F16F 2232/02* (2013.01)

(58) Field of Classification Search
  CPC ............... D06F 37/245; D06F 2103/26; Y10T 74/2109; Y10T 74/211; Y10T 74/2111; Y10T 74/2112; Y10T 74/2114; G01M 1/36; F01D 5/10; F16F 15/36; F16F 2222/08; F16F 2230/0011; F16F 2230/08; F16F 2230/18; F16F 2232/02
  See application file for complete search history.

(56) References Cited

U.S. PATENT DOCUMENTS

| | | | |
|---|---|---|---|
| 5,816,074 | A | 10/1998 | Kim |
| 6,363,756 | B1 | 4/2002 | Seagar et al. |
| 7,677,063 | B2 | 3/2010 | Jeon et al. |
| 9,175,430 | B2 | 11/2015 | Hasanreisoglu et al. |
| 9,303,351 | B2 | 4/2016 | Jun et al. |
| 9,303,352 | B2 | 4/2016 | Hasanreisoglu |
| 2002/0000108 | A1 | 1/2002 | Heyder et al. |
| 2008/0041188 | A1 | 2/2008 | Eckert et al. |
| 2010/0011515 | A1 | 1/2010 | Rhodes |
| 2012/0017645 | A1 | 1/2012 | Baron |
| 2012/0089258 | A1 | 4/2012 | Wong et al. |
| 2012/0233873 | A1 | 9/2012 | Del Pos et al. |
| 2012/0242205 | A1 | 9/2012 | Del Pos et al. |
| 2012/0278996 | A1 | 11/2012 | Park et al. |
| 2014/0083144 | A1 | 3/2014 | Hwang et al. |
| 2014/0298866 | A1 | 10/2014 | Hwang et al. |
| 2014/0366591 | A1 | 12/2014 | Kim et al. |
| 2016/0230328 | A1 | 8/2016 | Bae et al. |
| 2017/0121883 | A1 | 5/2017 | Hwang et al. |
| 2018/0179683 | A1 | 6/2018 | Son et al. |
| 2021/0246591 | A1 | 8/2021 | Papsdorf |
| 2021/0246595 | A1 | 8/2021 | Papsdorf |

FOREIGN PATENT DOCUMENTS

| | | |
|---|---|---|
| GB | 1401055 A | 7/1975 |
| WO | 2011083390 A1 | 7/2011 |
| WO | 2015119404 A1 | 8/2015 |

OTHER PUBLICATIONS

Extended European Search Report and Search Opinion; Application No. 20156327.7 dated Jul. 1, 2020; 9 pages.
International Search Report and Written Opinion; Application Ser. No. PCT/US2021/017396; dated Apr. 7, 2021, 15 pages.
Non- Final Office Action; U.S. Appl. No. 17/172,448 dated Jul. 22, 2022.
Non-Final Office Action; U.S. Appl. No. U.S. Appl. No. 17/172,479 dated Jul. 20, 2022.
Notice of Allowance; U.S. Appl. No. 17/172,448 dated Nov. 4, 2022.
Notice of Allowance; U.S. Appl. No. 17/172,479 dated Nov. 4, 2022.

* cited by examiner

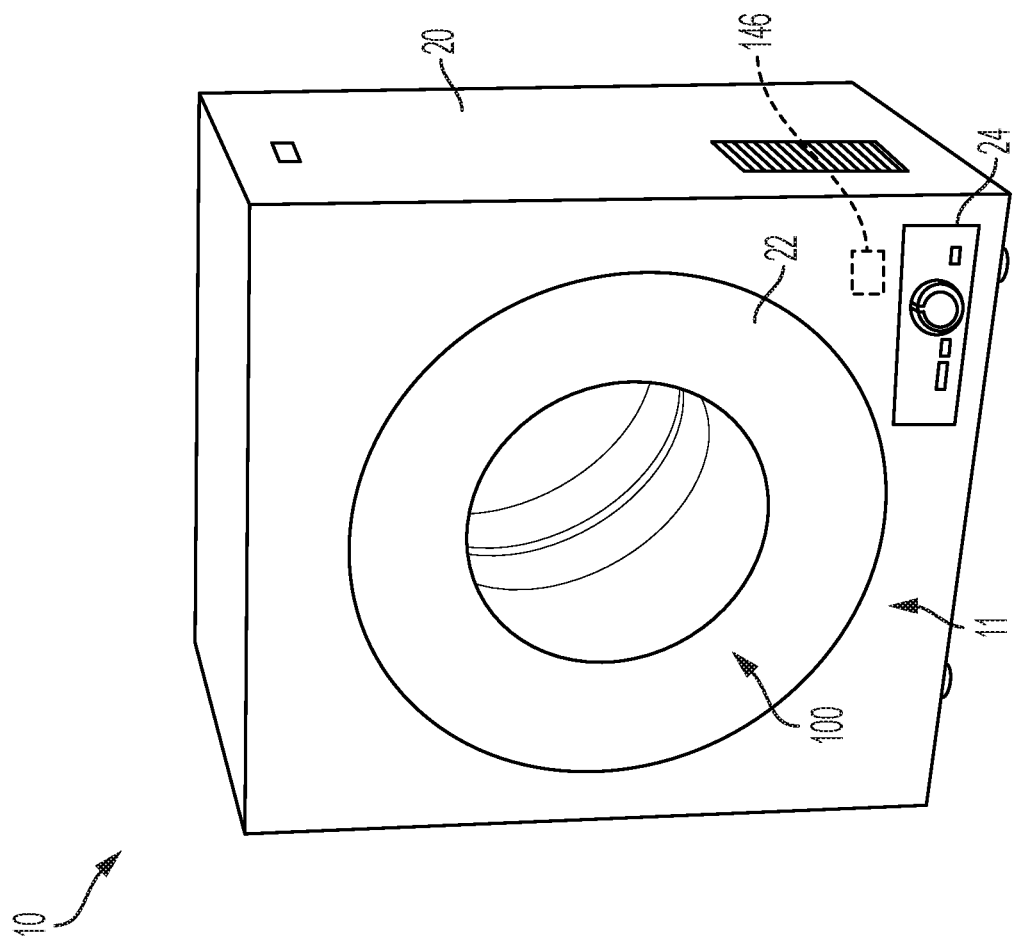

FIG. 1C

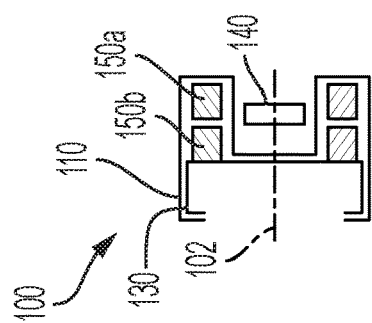
FIG. 7D
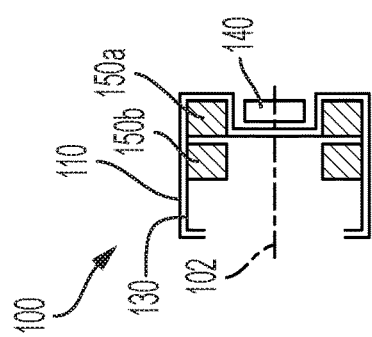
FIG. 7C
FIG. 7B
FIG. 7A
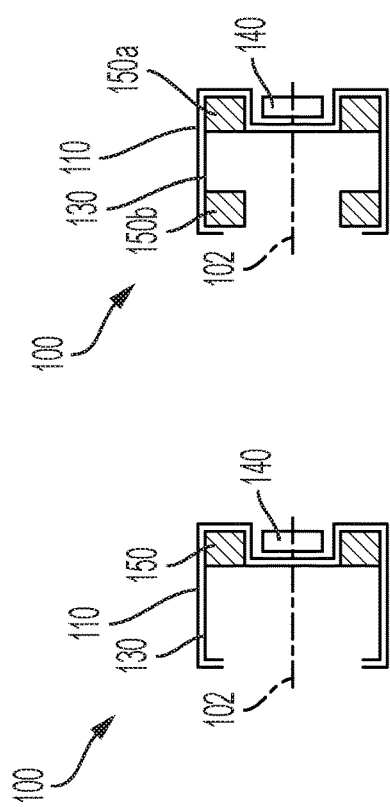
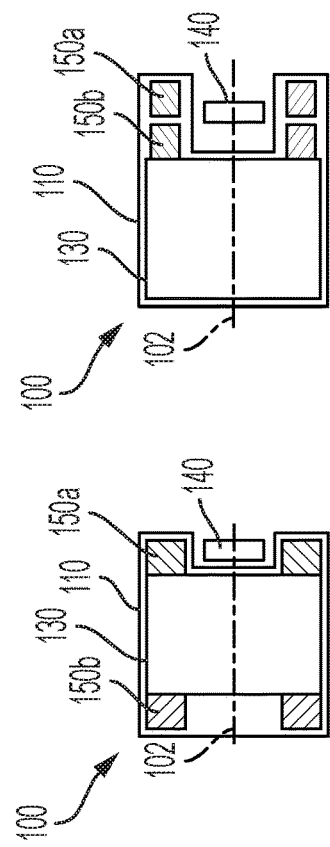
FIG. 7H
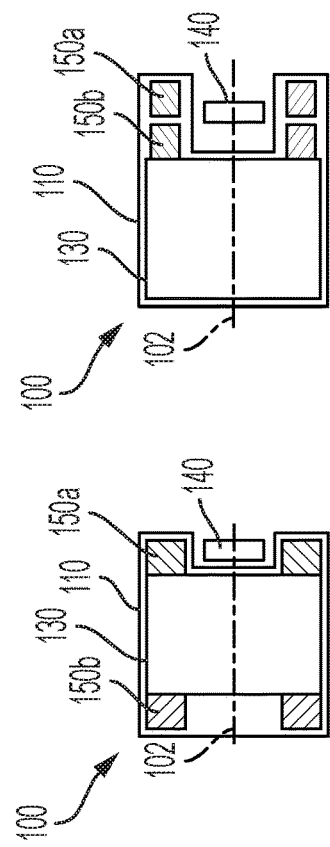
FIG. 7G
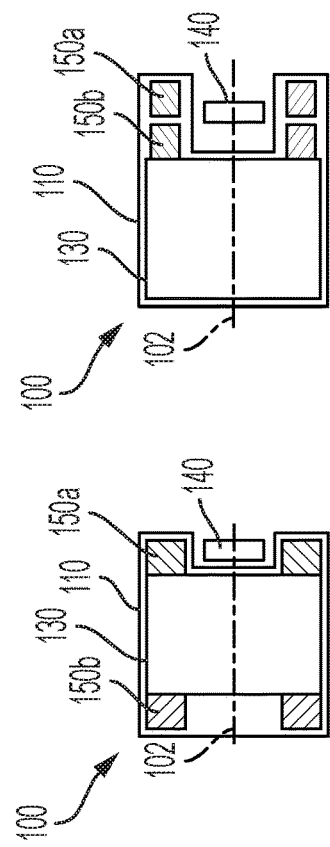
FIG. 7F
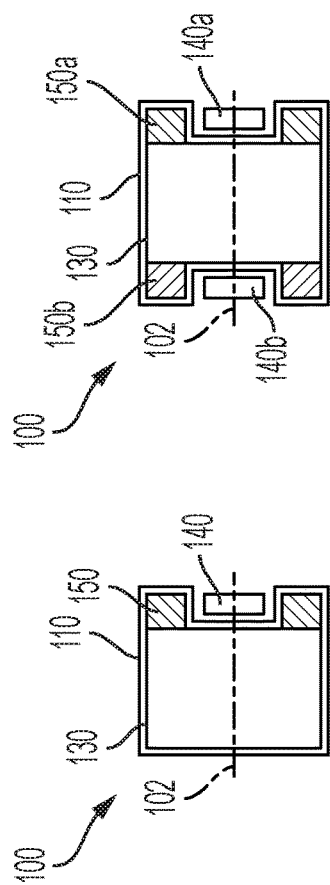
FIG. 7E

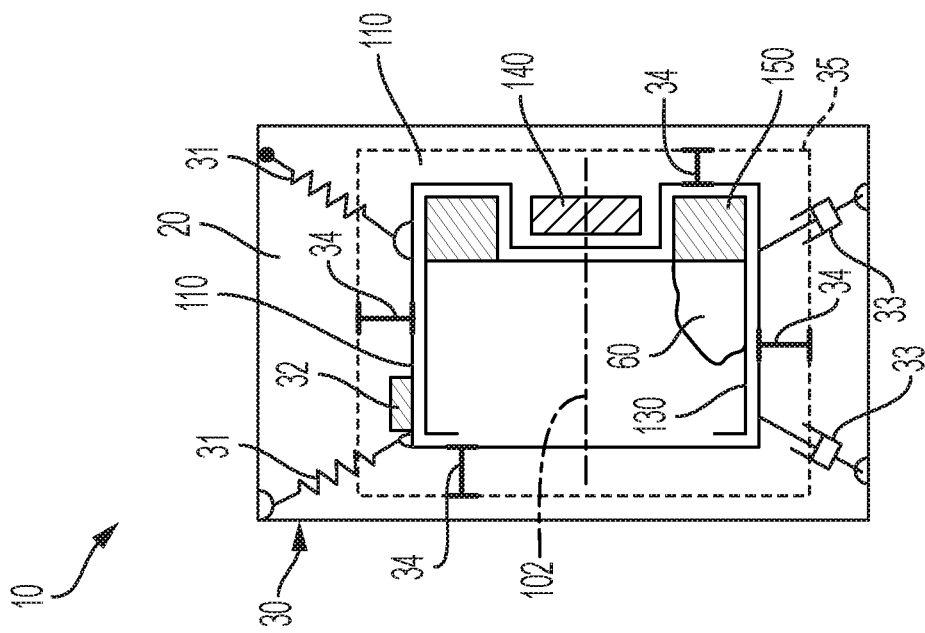
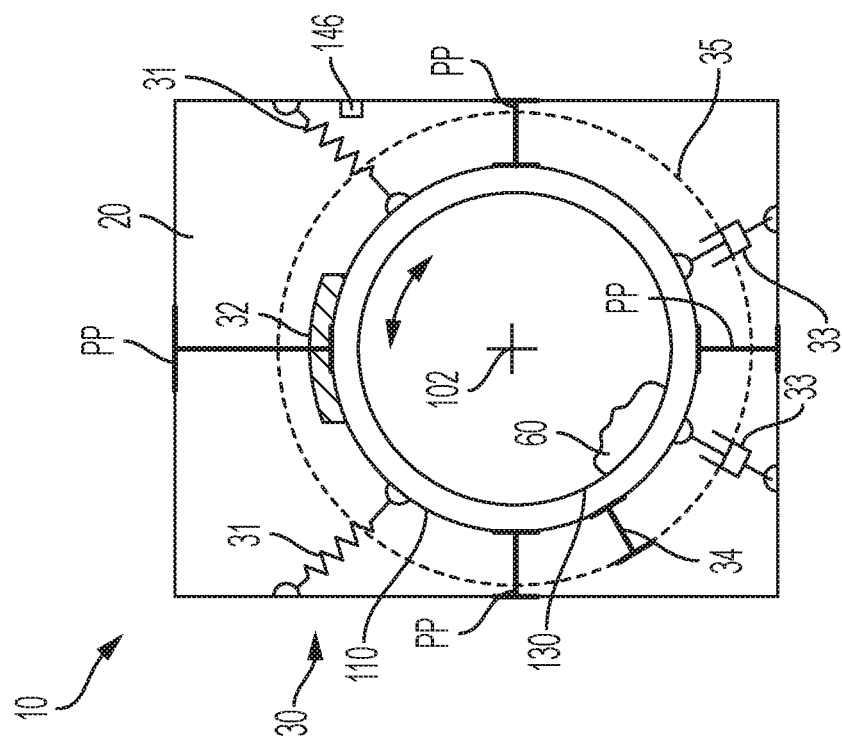
FIG. 8B
FIG. 8A

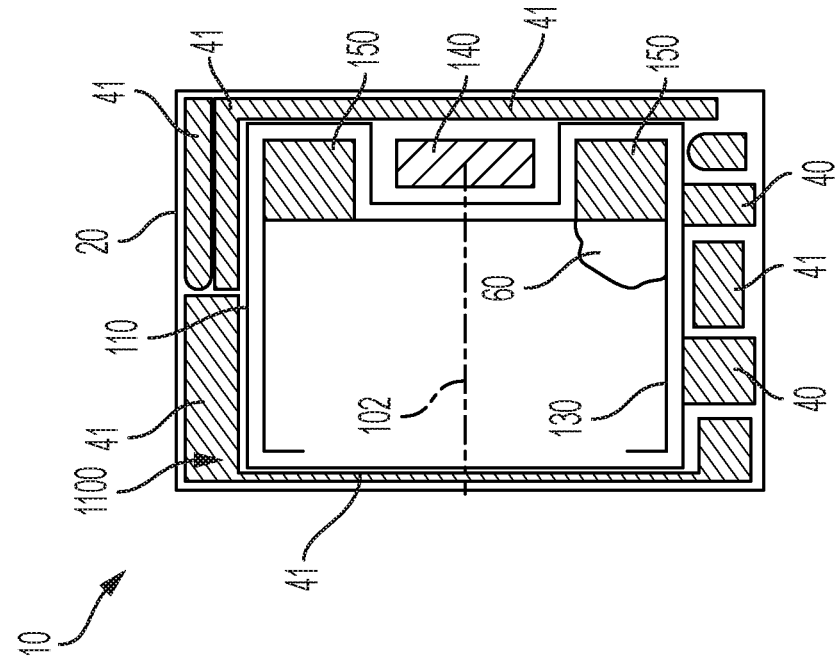

DYNAMIC BALANCING ASSEMBLIES AND LAUNDRY APPARATUSES HAVING ONE OR MORE CLOCKSPRINGS

FIELD

The present application relates to laundry apparatuses and in particular, laundry apparatuses that include dynamic balancing assemblies.

BACKGROUND

A laundry machine is an apparatus used to wash and/or dry a user's laundry (e.g., clothes, bedding, etc.). Generally, laundry machines having functionality to wash the user's laundry include a tub that receives and contains washing fluids (e.g., water, detergent, etc.), a drum rotatably installed in the tub, and a motor to rotate the drum. Through rotation of the drum, a series of washing stages including washing, rinsing, and spin cycle may be performed to substantially remove washing fluids from the laundry.

During the spin cycle, the drum typically spins laundry positioned therein at a rotational velocity sufficient for the centripetal acceleration to exceed gravitational acceleration causing the wet laundry to be pinned against the inside surface of the drum. Often the mass of the wet laundry is not uniformly distributed around the inside periphery of the drum and the composite center of mass of the rotating laundry is offset from the drum's axis of rotation. The offset of the center of mass of the rotating laundry from the primary rotation axis of the drum can generate strong vibrations, which can generate unwanted noise and/or damage components of the washing machine, such as the displaceable suspension, drum, drum bearings, tub, exterior housing, etc. Additionally, these vibrations may cause the entire laundry machine to vibrate which may be transmitted to the surrounding building in which the laundry machine is operated and/or cause the laundry machine to translate across the floor.

For this reason, laundry machines may include a balancing assembly to reduce vibration and stabilize the laundry machine by counteracting the load imbalance within the rotating drum. However, conventional balancing assemblies tend to be mounted to the drum in such a way that reduces capacity of the drum and therefore the reduces the amount of laundry the laundry machine is able to accommodate. Additionally, making a laundry machine larger to allow for greater load capacity may prevent use in smaller homes and/or apartments which may lack the appropriate space for larger laundry machines Accordingly, a need exists for laundry apparatuses that include dynamic load balancing assemblies while maximizing load capacity.

SUMMARY

In an embodiment, a dynamic balancing assembly for a laundry apparatus includes a control unit, one or more counterweight devices, and one or more clocksprings. The one or more counterweight devices are configured to be orbited about a primary rotation axis of the laundry apparatus to counteract a load imbalance in a drum of the laundry apparatus. The one or more clocksprings communicatively couple each of the one or more counterweight devices to the control unit.

In another embodiment, a laundry apparatus includes a tub, a drum, a control unit, a motor, and a dynamic balancing assembly. The tub defines a fluid containment envelope. The drum is positioned within the fluid containment envelope of the tub and rotatable relative to the tub about a primary rotation axis. The drum includes a laundry-receiving portion for receiving one or more articles of laundry. The motor is coupled to the tub, wherein the motor is communicatively coupled to the control unit and operatively coupled to the drum to cause rotation of the drum. The motor is isolated from fluid within the fluid containment envelope. The dynamic balancing assembly is communicatively coupled to the control unit, and includes one or more counterweight devices configured to be orbited about the primary rotation axis to counteract a load imbalance in the drum, and one or more clocksprings communicatively coupling each of the one or more counterweight devices to the control unit.

In another embodiment, a laundry apparatus includes a tub, a drum, a control unit, a motor, one or more load imbalance sensors, and a dynamic balancing assembly. The tub includes a fluid containment envelope and a motor receiving envelope that extends into a volume of the fluid containment envelope and is isolated from fluid received in the fluid containment envelope. The drum is positioned within the fluid containment envelope of the tub and rotatable relative to the tub about a primary rotation axis centrally positioned in the tub. The drum includes a laundry-receiving portion for receiving one or more articles of laundry. The motor is positioned within the motor receiving envelope such that the motor is positioned within the volume of the fluid containment envelope and isolated from the fluid received in the fluid containment envelope. The motor is communicatively coupled to the control unit and operatively coupled to the drum to cause rotation of the drum. The one or more load imbalance sensors are communicatively coupled to the control unit and configured to output a load imbalance signal to the control unit, the load imbalance signal being indicative of a load imbalance within the drum. The dynamic balancing assembly is communicatively coupled to the control unit and attached to the drum within the fluid containment envelope. The dynamic balancing assembly includes an orbital balancing passage arranged concentrically around the motor, a first counterweight device positioned within the orbital balancing passage and responsive to the control unit, a second counterweight device positioned within the orbital balancing passage and responsive to the control unit, a first clockspring communicatively coupling the first counterweight device to the control unit, and a second clockspring communicatively coupling the second counterweight device to the control unit. The control unit controllably moves the first counterweight device along the orbital balancing passage to adjust an angular position of the first counterweight device around the primary rotation axis to counteract a detected load imbalance in the drum. The control unit controllably moves the second counterweight device along the orbital balancing passage to adjust an angular position of the second counterweight device around the primary rotation axis to counteract the detected load imbalance in the drum.

BRIEF DESCRIPTION OF THE DRAWINGS

While the specification concludes with claims particularly pointing out and distinctly claiming the present invention, it is believed the same will be better understood from the following description taken in conjunction with the accompanying drawing in which:

FIG. 1A schematically illustrates a perspective view of a laundry apparatus, according to one or more embodiments shown and described herein;

FIG. 1C schematically illustrates a front cross-sectional view of the laundry apparatus of FIG. 1A with a balanced load, according to one or more embodiments shown and described herein;

FIG. 7A schematically illustrates a side cross-sectional view of a laundry apparatus, according to one or more embodiments, shown and described herein;

FIG. 7B schematically illustrates a side cross-sectional view of a laundry apparatus, according to one or more embodiments, shown and described herein;

FIG. 7C schematically illustrates a side cross-sectional view of a laundry apparatus, according to one or more embodiments, shown and described herein;

FIG. 7D schematically illustrates a side cross-sectional view of a laundry apparatus, according to one or more embodiments, shown and described herein;

FIG. 7E schematically illustrates a side cross-sectional view of a laundry apparatus, according to one or more embodiments, shown and described herein;

FIG. 7F schematically illustrates a side cross-sectional view of a laundry apparatus, according to one or more embodiments, shown and described herein;

FIG. 7G schematically illustrates a side cross-sectional view of a laundry apparatus, according to one or more embodiments, shown and described herein;

FIG. 7H schematically illustrates a side cross-sectional view of a laundry apparatus, according to one or more embodiments, shown and described herein;

FIG. 8A illustrates a front cross-sectional view of a laundry apparatus with a tub and drum assembly mounted to an exterior housing through a displaceable suspension assembly, according to one or more embodiments shown and described herein;

FIG. 8B illustrates a side cross-sectional view of the laundry apparatus of FIG. 8A, according to one or more embodiments shown and described herein;

FIG. 10A Illustrates a front cross-sectional view of a laundry apparatus with a tub and drum assembly mounted to an exterior housing through one or more tub mounts with additional laundry apparatus components positioned within free space between the exterior housing and the tub and drum assembly, according to one or more embodiments shown and described herein; and FIG. 10B illustrates a side cross-sectional view of the laundry apparatus of FIG. 10A, according to one or more embodiments shown and described herein.

DETAILED DESCRIPTION

Figure 1B:
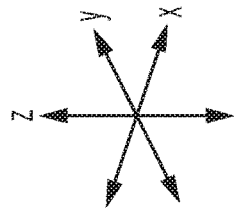
FIG. 1B schematically illustrates a front cross-sectional view of the laundry apparatus of FIG. 1A with an imbalanced load, according to one or more embodiments shown and described herein.

Embodiments described herein may be understood more readily by reference to the following detailed description. It is to be understood that the scope of the claims is not limited to the specific compositions, methods, conditions, devices, or parameters described herein, and that the terminology used herein is not intended to be limiting. In addition, as used in the specification, including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent basis "about," it will be understood that the particular values form another embodiment. All ranges are inclusive and combinable.

Embodiments described herein are generally directed to a laundry apparatuses that include dynamic balancing assemblies while maximizing volumetric space for receiving laundry. For example, and as illustrated in the figures, a laundry apparatus according to the present disclosure generally includes a tub, a drum, and a dynamic balancing assembly. The drum is positioned within a fluid containment envelope of the tub and is rotatable relative to the tub about a primary rotation axis, the drum defines a laundry-receiving portion for receiving one or more articles of laundry. The dynamic balancing assembly includes an orbital balancing passage, arranged concentrically around a motor of the laundry apparatus, and first and second counterweight devices are positioned within the orbital balancing passage. The dynamic balancing assembly is positioned relative to the tub and/or drum so that a common cross-sectional plane passes through the dynamic balancing assembly, the motor, and the fluid containment envelope of the tub. As shown in the illustrated embodiments, such configuration allows for maximization of volume within the tub while still providing desired load balancing. These and additional features will be discussed in greater detail below.

As used herein, the term laundry apparatus may include a washing machine or combination washer/dryer machine. For example, the term laundry apparatus can describe any machine that relies on the centripetal acceleration from spinning to extract fluid from a wetted textile material including a dry cleaning machine, a washing machine, a washing machine employing working fluid other than water, centrifugal spinner, laundry dryer, etc. Additionally, laundry apparatuses may include any sized laundry apparatus including, but not limited to, industrial or residential sized units (including miniaturized and/or apartment units).

Referring to FIG. 1A, a laundry apparatus 10 is generally depicted. The laundry apparatus 10 may include an enclosed exterior housing 20. Positioned within and supported by the exterior housing 20 is a tub and drum assembly 100. The tub and drum assembly 100 may be accessible through an exterior housing port 11 formed within the exterior housing 20 that is selectively accessible by opening/closing of a hinged door 22, for example. The laundry apparatus 10 may be a front-load laundry apparatus (e.g., a front-load washing machine) or, in other embodiments, may be a top load laundry apparatus (e.g., a top-load washing machine). In other embodiments the exterior housing port 11 might be positioned anywhere around the exterior housing 20 such as the side, back, bottom, or at some oblique angle.

Still referring to FIG. 1A, the laundry apparatus 10 may further include a control unit 24. The control unit 24 may include processing circuitry and a non-transitory memory that includes logic in the form of machine-readable instructions that is used to control one or more operations of the laundry apparatus 10 as will be described in greater detail herein. For example, the control unit 24 may execute logic to operate valves and pumps during the washing and/or drying cycles, thereby controlling the various washing, rinsing, and spin cycles. The control unit 24 may further control a balancing operation by a dynamic balancing assembly 150, which will be described in greater detail below.

Referring now to FIG. 1B the laundry apparatus 10 is depicted more schematically to further illustrate the tub and drum assembly 100 within the exterior housing 20, the tub and drum assembly 100 includes a tub 110 and a drum 130. The drum 130 is configured to rotate about a primary rotation axis 102 within the tub 110. The primary rotation axis 102 can be horizontal (e.g., parallel to the X/Y plane of the depicted coordinate axes), vertical (e.g., parallel to Z axis of the depicted coordinate axes), or at any angle, relative to the depicted coordinate axes.

Laundry 60 may be placed inside the drum 130 for laundering purposes. Laundry 60 may include, for example, soiled clothing, linens, and other fabric or textile articles. The laundry 60 may be washed and rinsed inside the drum 130. During washing and rinsing with water, the laundry 60 may absorb water increasing the weight of the laundry 60. The mass of water absorbed may be, for example, about 200% to about 400% the dry weight of the laundry 60. Much of the absorbed water can be extracted mechanically by applying sustained high centripetal acceleration to the laundry 60 by spinning of the drum 130. Spinning speeds may be about 700 rpm to about 1400 rpm. Centrifugal water extraction is commonly referred to as the spin cycle and depending on spin speed and geometry can generate centripetal acceleration of about 100 to about 600 times the acceleration of gravity. During the spin cycle, the drum 130 spins the laundry 60 at a rotational velocity sufficient for the centripetal acceleration to exceed gravitational acceleration such that the wet laundry 60 is pinned against the inside surface of the drum 130. The rotational velocity sufficient for the centripetal acceleration to exceed gravitation acceleration is known as the satellite speed.

As noted above, during the spin cycle, the mass of the wet laundry 60 may not be uniformly distributed around the inside periphery of the drum 130. Referring now to FIG. 1C, a schematic cross-sectional view of the tub and drum assembly 100 is depicted. As illustrated, the center of mass 61 of the rotating laundry 60 may be offset from the primary rotation axis 102 of the drum 130, resulting in an imbalanced load within the drum 130. This imbalanced load can generate vibrations within the laundry apparatus 10. Such vibrations can generate unwanted noise, cause damage to the laundry apparatus 10, cause the laundry apparatus 10 to travel across the floor, and or transmit vibrations to the surrounding building in which the laundry apparatus 10 is used, and/or cause unwanted vibration of the entire laundry apparatus 10 which can, as noted above, transmit into surrounding structure and shake the building in which the laundry apparatus 10 is used. As will be described in greater detail herein, load imbalance sensors 146 may be provided to detect the magnitude and rotational position of the imbalance and a dynamic balancing assembly 150 responsive to the detected load imbalance may be actuated to balance the laundry 60 within the drum 130.

Figure 1B:
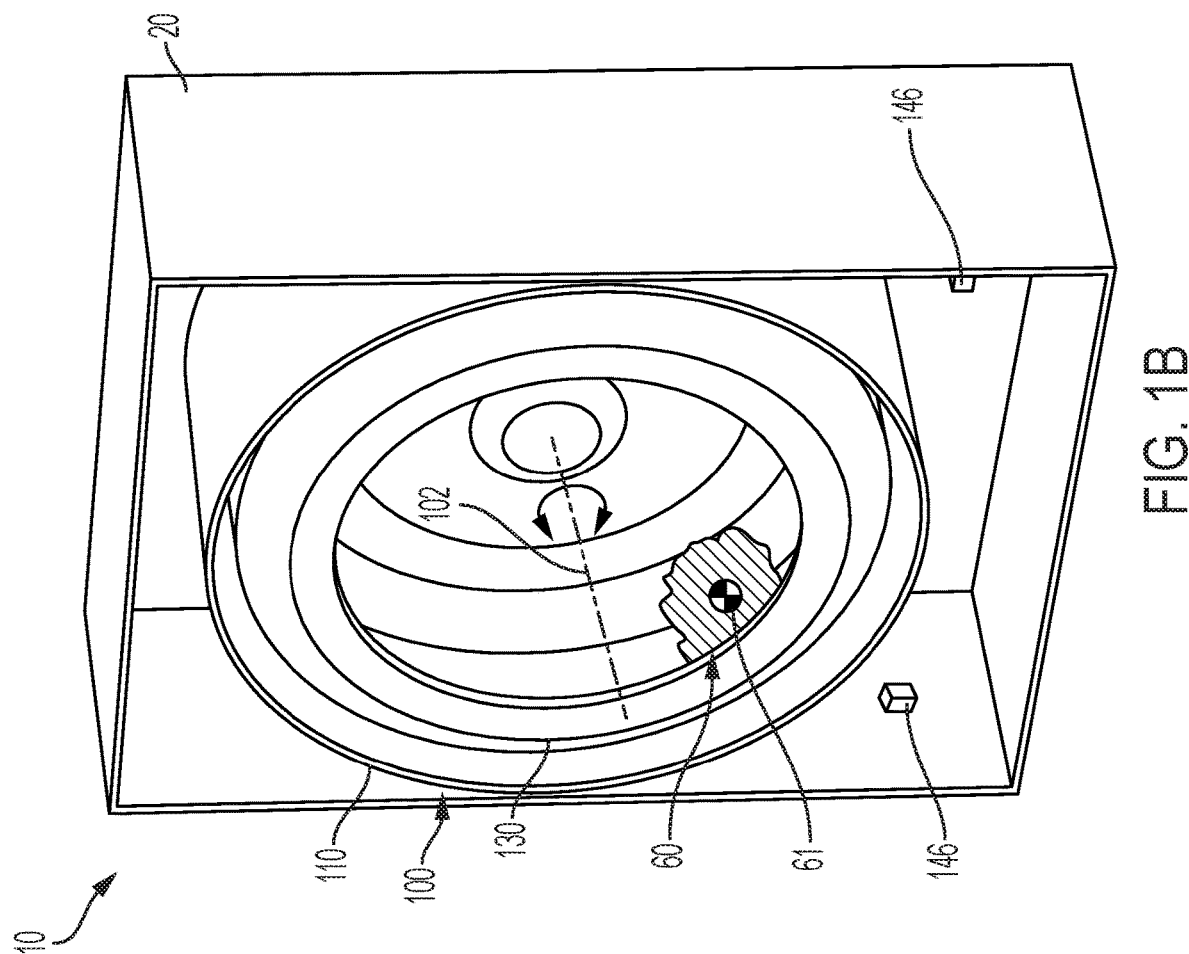
Figure 1C:
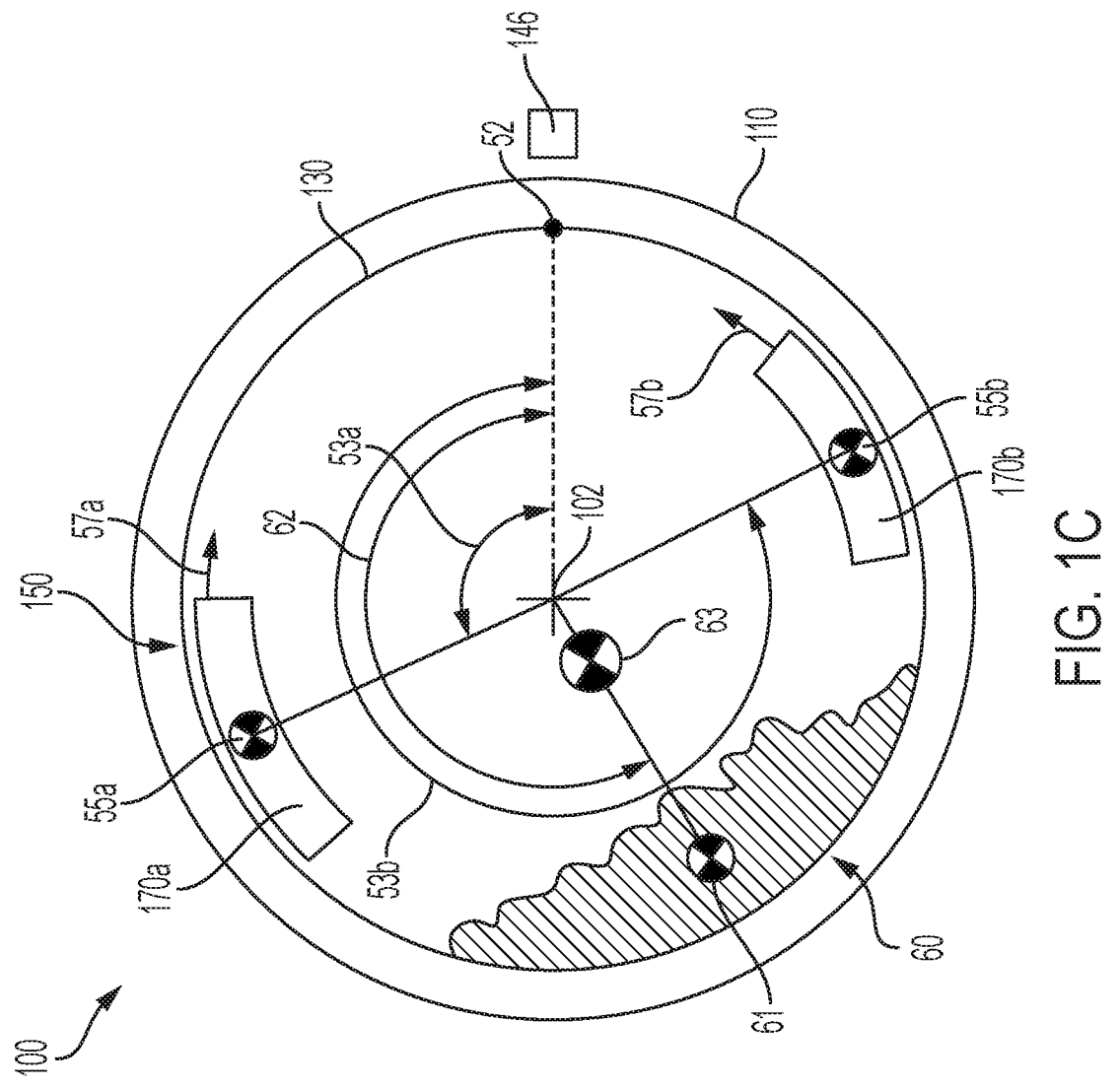
Figure 1D:
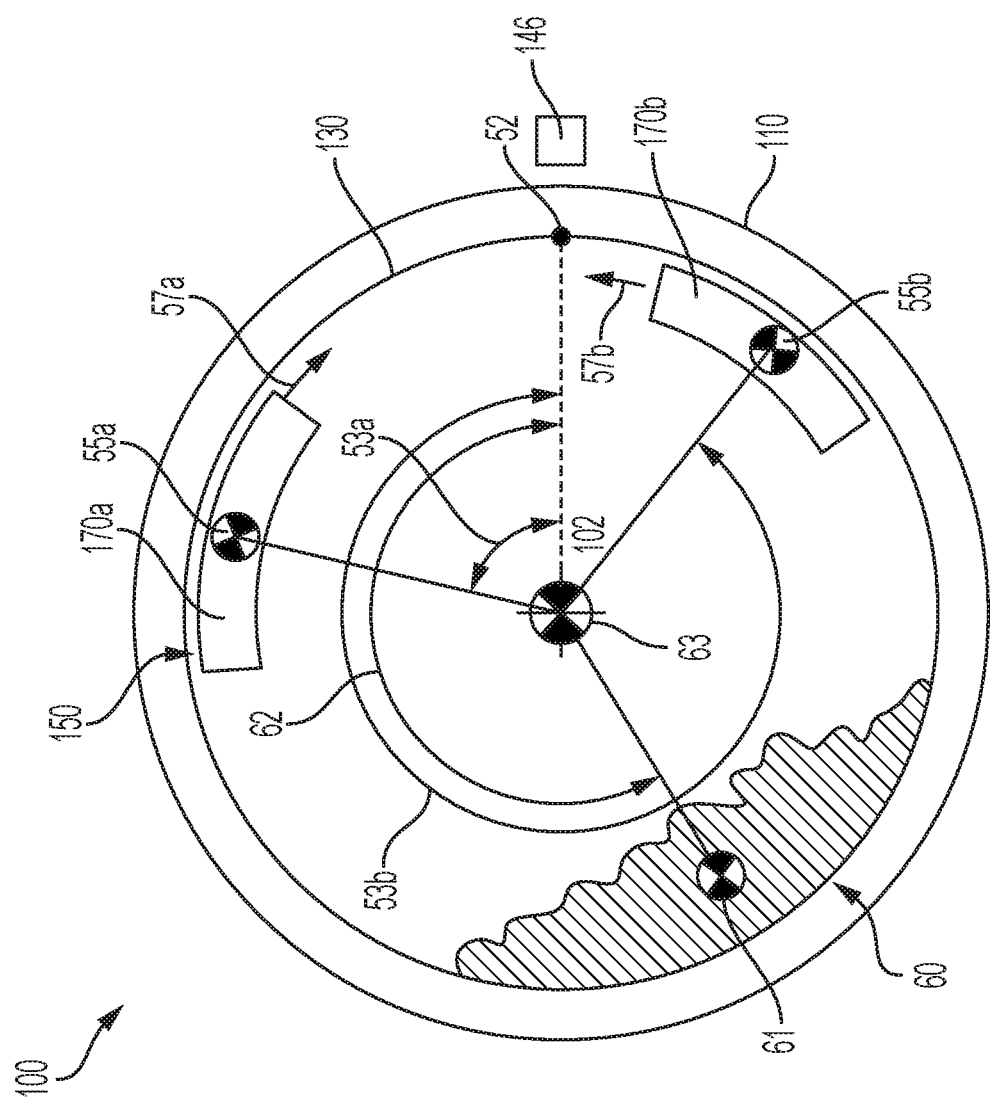
FIG. 1D schematically illustrates a perspective view of an enclosed laundry apparatus, according to one or more embodiments shown and described herein.

For example, and as will be described in greater detail herein, the dynamic balancing assembly 150 can be employed to reduce or eliminate the vibration caused by imbalanced laundry 60. The dynamic balancing assembly 150 may include one or more counterweight devices and can include in some embodiments, at least two counterweight devices. For example, the dynamic balancing assembly may include a first counterweight device 170a and a second counterweight device 170b that are restrained to the rotating drum 130. In the illustrated embodiments, the counterweight devices 170a, 170b follow an orbital path at a fixed radius from the primary rotation axis 102. The relative angular position 53a, 53b for each counterweight device 170a, 170b can be adjusted relative to the reference angular position 52 on drum 130. As an example load balancing operation, before the spin cycle, the angular positions 53a and 53b may be adjusted such that counterweight devices 170a and 170b are across from each other to provide balance between the first counterweight device 170a and the second counterweight device 170b. The center of mass 55a for first counterweight device 170a and center of mass 55b for second counterweight device 170b have a combined center of mass at the primary rotation axis 102. At speeds of about 100 rpm to about 200 rpm, the laundry 60 may be pinned by centripetal acceleration against the inside surface of rotating drum 130. While pinned to the surface of the rotating drum, the center of mass 61 of the laundry 60 may be fixed at an angular position 62 from the reference angular position 52. As illustrated, without balancing, the combined center of mass 63 (e.g., of the laundry 60, the first counterweight device 170a, and the second counterweight device 170b) is offset from the primary rotation axis 102 and will generate an imbalance and create vibration. As will be described in greater detail herein, load imbalance sensors 146 can detect the magnitude and rotational position of the combined center of mass 63. Based on the detected magnitude and angular position 62 of the combined center of mass 63, the angular positions 53a and 53b of the counterweight devices 170a, 170b can be adjusted (e.g., in a direction 57a, 57b of orbital travel) to shift the combined center of mass 63 closer to the primary rotation axis 102, as illustrated in FIG. 1D. When balanced, the combined center of mass 63 may be coincident to the primary rotation axis 102. A balanced laundry apparatus 10 will run smoothly without substantial vibration.

Figure 2A:
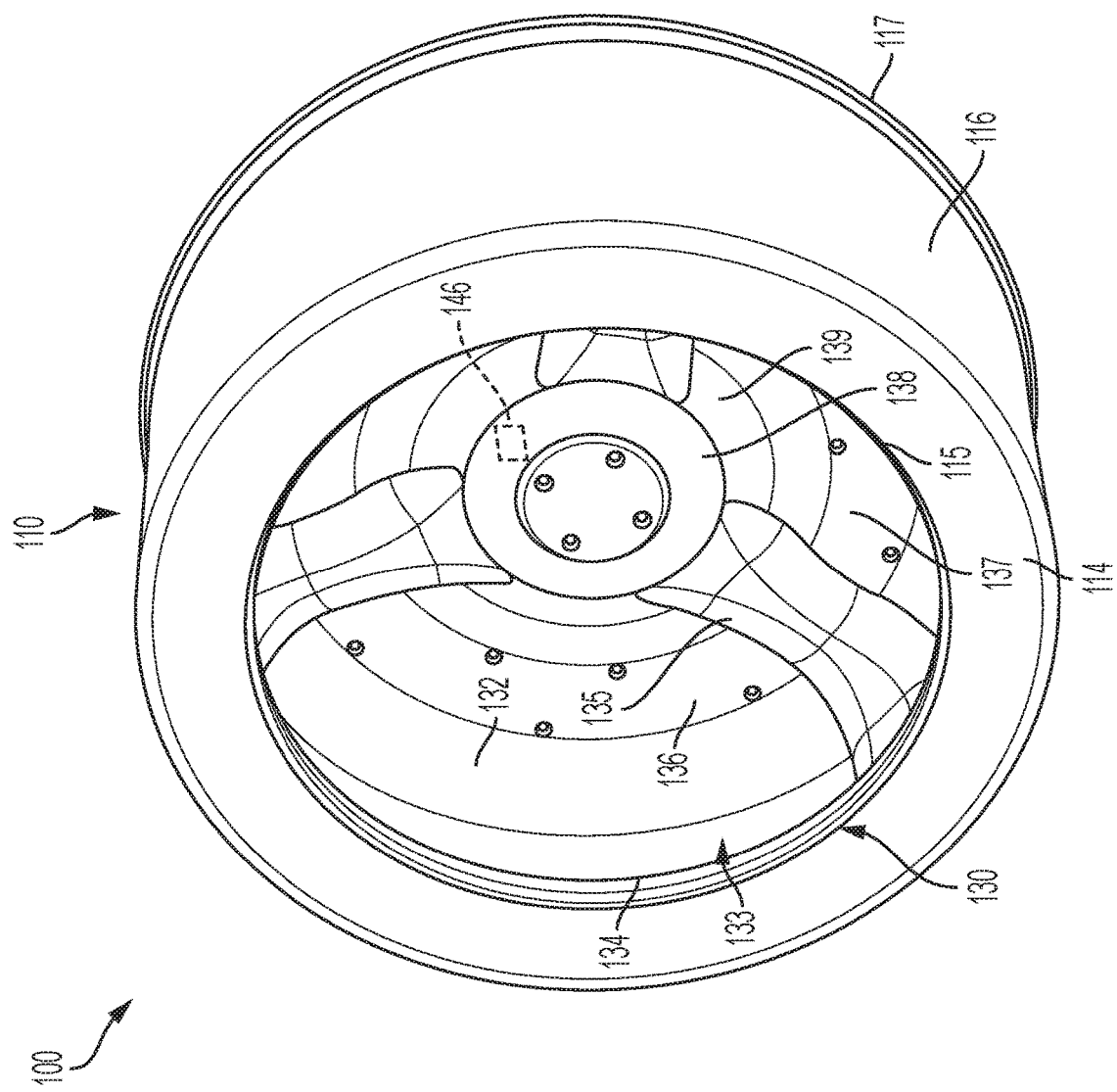
FIG. 2A schematically depicts a front perspective view of a tub and drum assembly of the laundry apparatus of FIG. 1, according to one or more embodiments shown and described herein.
Figure 2B:
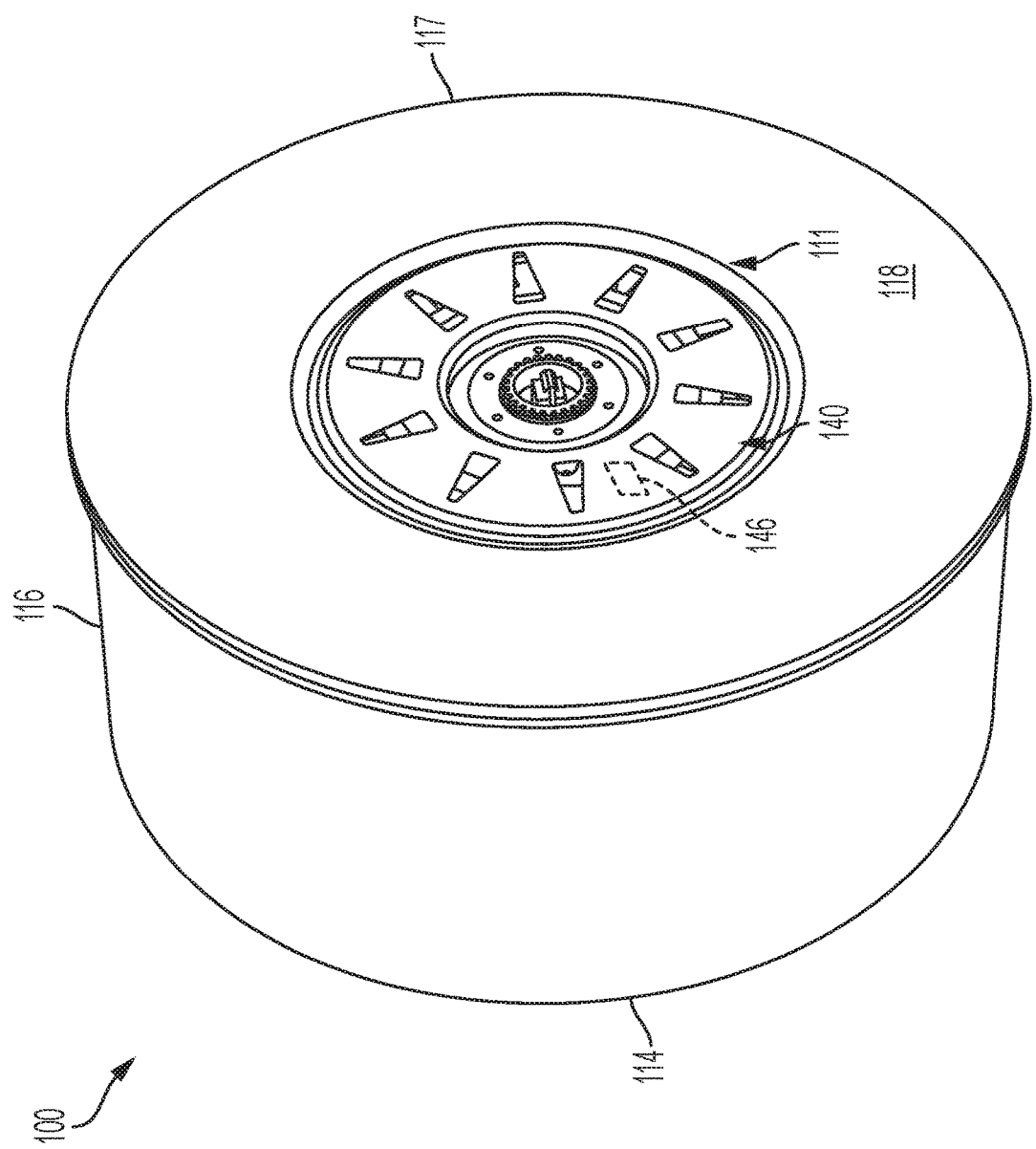
FIG. 2B schematically depicts a rear perspective view of a tub and drum assembly of the laundry apparatus of FIG. 1, according to one or more embodiments shown and described herein.
Figure 2C:
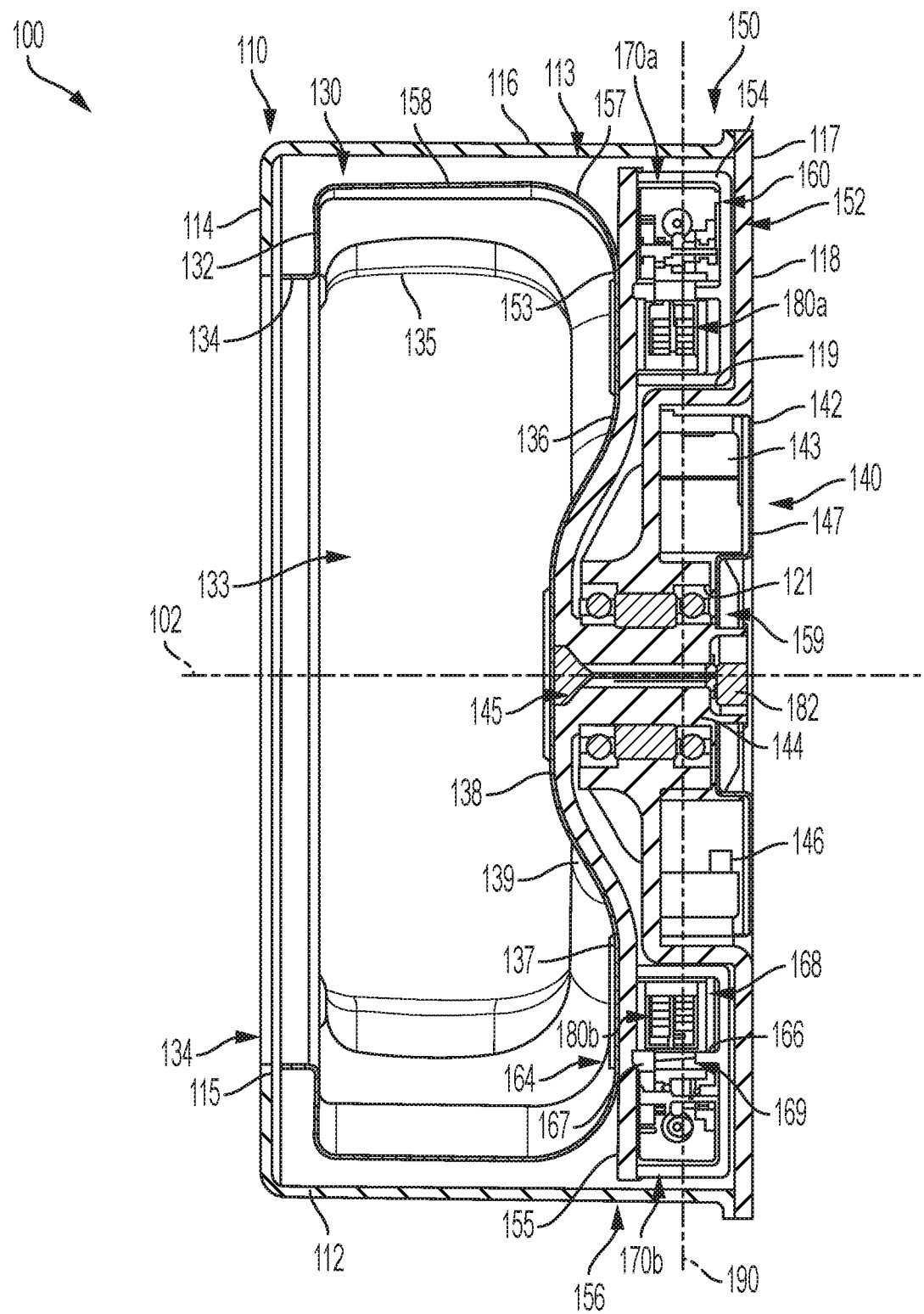
FIG. 2C schematically depicts a side cross-sectional view of the tub and drum assembly of FIGS. 2A and 2B, according to one or more embodiments shown and described herein.
Figure 3:
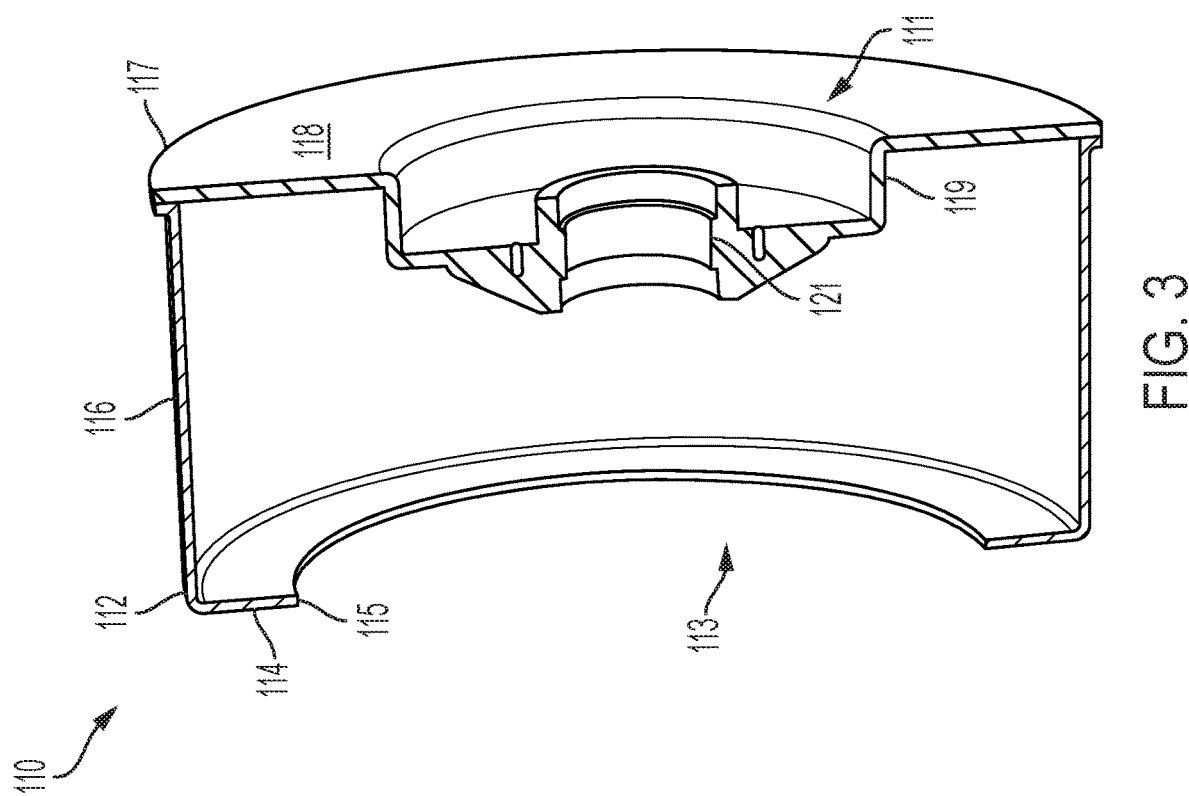
FIG. 3 schematically depicts a side cross-sectional view of a tub of the tub and drum assembly of FIGS. 2A and 2B in isolation.

FIGS. 2A and 2B illustrate the tub and drum assembly 100 in isolation from the exterior housing 20 of the laundry apparatus 10. FIG. 2C illustrates a cross-sectional view of the tub and drum assembly 100 of FIGS. 2A and 2B. Referring collectively to FIGS. 2A-2C, the tub and drum assembly 100 generally include a tub 110, a drum 130, a motor 140, one or more load balance sensors 146, and the dynamic balancing assembly 150, The tub 110 is configured to support rotation of various components of the laundry apparatus 10 mounted thereto, while also containing washing fluids (e.g., water, detergent, bleach, softener, etc.) therein. A cross-section of the tub 110 in isolation from the tub and drum assembly 100 is illustrated in FIG. 3. The tub 110 comprises a tub body 112 that is shaped to provide a fluid containment envelope 113. The tub body 112 may also be shaped to provide a motor receiving envelope 111 that extends into a volume of the fluid containment envelope 113.

The tub body 112 may include a front wall 114 that is sized and shaped to surround exterior housing port 11 (illustrated in FIG. 1A) and defines a tub laundry port 115. A sidewall 116 of the tub body 112 may extend from the front wall 114 to a rear wall 117, which defines a maximum depth of the tub 110, to provide the fluid containment envelope 113. Ports, not shown, for the ingress and egress of fluid into the fluid containment envelope 113 may be provided within the tub body 112.

Formed within the rear wall 117 of the tub body 112 is the motor receiving envelope 111 sized and shaped to receive and support the motor 140 therein. For example, the rear wall 117 may define a rear-facing surface 118. The motor receiving envelope 111 may extend from the rear-facing surface 118 into a volume of the fluid containment envelope 113. In particular, a depth of the motor receiving envelope 111 may correspond to an axial depth of the motor 140 such that the motor 140 is substantially flush with or inset from with a rear-facing surface 118 of the rear wall 117. The tub body 112 may further define a drive shaft opening 121 to support a drive shaft 144 extending from the motor 140 to be coupled to the drum 130. The drive shaft 144 may be supported by a main bearing assembly 159 that is fixedly attached to the tub 110 (e.g., to a surface of the drive shaft opening 121) and operatively connected to the drum 130 thereby providing radial and axial support to the drum 130.

In some embodiments, the main bearing assembly 159 includes a pair of rolling bearings such as deep groove ball bearings, angular contact bearings, cylindrical roller bearings, tapered roller bearings, spherical roller bearings, etc. The main roller bearing assembly may also include polymer or metallic bushings, air bearings, or magnetic bearings. The main bearing assembly 159 is configured to provide radial and axial support for the drum 130 as well as transmit any moments generated by imbalances in the drum 130 to the tub 110.

Referring to FIG. 2C, the drum 130 is illustrated in a cantilevered configuration where the drum is supported from the rear by the main baring assembly 159 which is opposite of the drum opening 134 on the front side of the drum 130. To better support moments from the drum 130, it may be beneficial to maximize axial separation between bearing elements in the main bearing assembly 159. As illustrated in FIG. 2C, the main bearing assembly 159 and drive shaft opening 121 can be axially extended back to fit inside the motor 140 and forward inside the protruding portion 138 of the drum body 132. However, in other embodiments the drum 130 may be supported by a bearing assembly 159 on each end of the drum 130. In such embodiment, the drum opening 134 might be on the front end of the drum 130 or might be on the side of the drum 130.

As noted above, the motor 140 may be operatively coupled to the drum 130 for rotating the drum 130 within the fluid containment envelope 113 of the tub 110. For example, the motor 140 may be rotatively coupled to the drum 130 via the drive shaft 144 that extends through the drive shaft opening 121. In some embodiments, the drive shaft 144 might be directly attached to the drum 130. In other embodiments, the drive shaft 144 might be attached to a support plate 156 and support plate 156 attached to the drum 130. In other embodiments, the drive shaft 144 may be integrally formed with the drum 130. In some embodiments, the drum 130 may be magnetically driven, such that no drive shaft 144 is needed. In some embodiments, the motor rotor 142 may be directly attached to the drum 130 and, such that no drive shaft 144 is needed.

The motor receiving envelope 111 of the tub 110 substantially isolates the motor 140 from washing fluid within the tub 110 and drum 130. For example, the motor receiving envelope 111 may have a first inset wall 119 that extends into the volume of the fluid containment envelope 113 between the motor 140 and the orbital balancing passage 152, as will be described in greater detail below. In some embodiments, the motor 140 may include a motor rotor 142 and a motor stator 143. In the illustrated embodiment, at least a surface of the tub 110 and a surface of the motor 140 are substantially flush with one another. For example, and as illustrated an outer surface 147 of the motor rotor 142 is substantially flush with the rear-facing surface 118 of the tub 110. Such may allow the tub 110 in close proximity with a back wall of the exterior housing 20 of the laundry apparatus 10, thus maximizing the volume within the exterior housing 20 which may be used for laundry washing and/or drying purposes. In some embodiments, the surface of the tub 110 and the surface of the motor 140 may be offset from one another.

Referring again to FIGS. 2A-2C, the drum 130 is positioned within the fluid containment envelope 113 of the tub 110 and is rotatable relative to the tub 110 about a primary rotation axis 102 (illustrated in FIG. 2C). The drum 130 includes a drum body 132 that is shaped to provide a laundry-receiving portion 133 for receiving one or more articles of laundry therein. For example, the laundry-receiving portion 133 may include a drum opening 134 for receiving/removal of laundry into the drum body 132. The drum opening 134 may be arranged within the fluid containment envelope 113 of the tub 110 so as to be aligned with the tub laundry port 115 for access into the drum body 132. The drum body 132 may include a plurality of apertures (not shown) to allow fluid to flow into and out of the drum body 132.

The drum body 132 may extend from the drum opening 134 to a base wall section 136. The base wall section 136 may define a recessed portion 137 and a protruding portion 138. The protruding portion 138 may be centrally arranged on the primary rotation axis of the drum 130. The recessed portion 137 may be concentrically arranged around the protruding portion 138 with a sloping wall 139 joining the recessed portion 137 and the protruding portion 138. Stated another way, a depth of the laundry-receiving portion 133 of the drum 130 may be greatest when measured at the recessed portion 137, and shortest when measured at the protruding portion 138. The protruding portion 138 may be coupled to a drive shaft 144 of the tub and drum assembly 100.

The drum 130 may further include one or more agitators 135 coupled to or integral with the drum body 132. The one or more agitators 135 may be arranged to provide agitation to washing fluids and laundry within the laundry-receiving portion 133 of the drum 130. The one or more agitators 135 may aid in removing debris from laundry through contact of the laundry with the one or more agitators 135. The one or more agitators 135 may extend along a sidewall section 158 of the drum 130 and along the base wall section 136 to the protruding portion 138. The one or more agitators 135 may be evenly spaced around the circumference of the drum 130.

Coupled to the base wall section 136 may be the dynamic balancing assembly 150. The dynamic balancing is configured to counter imbalances within the drum and tub assembly 100 created by spinning laundry, which may result in a smooth operation of the laundry apparatus 10 and eliminate a need to suspend the tub 110 from the exterior housing 20 by a traditional displaceable suspension system (e.g., springs, dampers, masses, etc.).

The dynamic balancing assembly 150 is adjustably arranged by the control unit 24 to balance a load imbalance within the tub and drum assembly 100. The load imbalance can be detected by the control unit 24 based on an output of one or more load imbalance sensors 146. However, it is contemplated that, in some embodiments, the dynamic balancing assembly 150 can be passive in operation with no automatic adjustment by the control unit 24. Some examples of passive dynamic balancing assembly may include rings filled with fluids or weighted balls.

Still referring to FIG. 2C, in order to facilitate dynamic balancing, the dynamic balancing assembly 150 may include an orbital balancing passage 152, a first counterweight device 170a, and a second counterweight device 170b positioned within the orbital balancing passage 152. As noted above with reference to FIGS. 1C and 1D, the angular position for the first and second counterweight device 170a, 170b are adjustable relative to the reference angular position 52 of the drum to move the combined center of mass 63 of the laundry 60 and the first counterweight device 170a, and the second counterweight device 170b. The angular position 53a of the first counterweight device 170a and the angular position 53b of the second counterweight device 170b may be adjusted by any amount to move the combined center of mass 63 to be substantially coincident with the primary rotation axis 102. During some balancing operations, the first and second counterweight devices 170a, 170b may be adjusted by a total angular displacement of 360 degrees or more during the spin cycle.

The orbital balancing passage 152 may provide a passage through which the first and second counterweight devices 170a, 170b may travel to balance a load imbalance within the tub and drum assembly 100. For example, the orbital balancing passage 152 may be arranged concentrically around and provide an arcuate passage around the motor 140 and the primary rotation axis 102. The orbital balancing passage 152 may be the coupled to the base wall section 136 of the drum 130. In some embodiments, and as depicted, the orbital balancing passage 152 may be coupled to the base wall section 136 by a support plate 156. The orbital balancing passage 152 may be coupled to the support plate 156 through any coupling techniques (e.g., welding, brazing, fastening, etc.) or may be integrally formed therewith. In some embodiments, the orbital balancing passage 152 may instead be directly coupled or integrally formed with the base wall section 136 of the drum 130.

The orbital balancing passage 152 may include a passage body 154, which constrains motion of the first and second counterweigh devices 170a, 170b to an orbiting motion about the primary rotation axis 102. For example, the orbital balancing passage 152 may define a first orbital chamber 160 in which at least one of the first and second counterweight devices 170a, 170b sit. It is noted that while the first and second counterweight devices 170a, 170b are illustrated as being positioned within the same orbital chamber. In some embodiments, the first and second counterweight devices 170a, 170b may sit in parallel but separate orbital chambers. Such parallel orbital loads chambers may allow for concentration of the center of masses 55a, 55b of the first and second counterweight device 170a, 170b at the same angular position to provide greater load balance capabilities. In alternative embodiments the orbital balancing passage 152 does not include a passage body 154 that constrains radial motion of the first and second counterweight devices. Instead, the orbital chamber 160 may include a ring-shaped region of volume around the motor 140 and tub first inset wall 119. For example, the first and second counterweight devices 170a, 170b can be rigidly coupled to disks coupled to a rotational shaft rotating around primary rotation axis 102.

In embodiments, to maintain the first and second counterweight devices 170a, 170b within the first orbital chamber 160, the dynamic balancing assembly 150 may include an orbital positioning device 164 arranged to enclose the first and second counterweight devices 170a, 170b within the orbital balancing passage 152. The orbital positioning device 164 may further be arranged to restrain a first angular position of the first counterweight device 170a and a second angular position of the second counterweight device 170b within the orbital balancing passage 152. For example, the orbital positioning device 164 may be a restraining wall 166, which constrains the first and second counterweight devices 170a, 170b into contact with the orbital balancing passage 152, such that the first and second counterweight devices 170a, 170b are only able to move in an arcuate path at a constant radius around the primary rotation axis 102 of the tub and drum assembly 100.

In some embodiments, the orbital positioning device 164 may include a ring gear 167 that interacts with the first and second counterweight devices 170a, 170b to allow the first and second counterweight devices 170a, 170b to engage and traverse the ring gear 167 to move in an arcuate path about the primary rotation axis 102 of the tub and drum assembly 100 while remaining positioned within the first orbital chamber 160.

In some embodiments, the orbital positioning device 164 may include both a ring gear 167 and a restraining wall 166, which are positioned directly parallel to one another and are separated from one another by a gap 169. As will be explained in greater detail herein, the gap 169 may allow for passage of one or more wires for communicatively coupling the first and second counterweigh devices 170a, 170b with the control unit 24.

Figure 4:
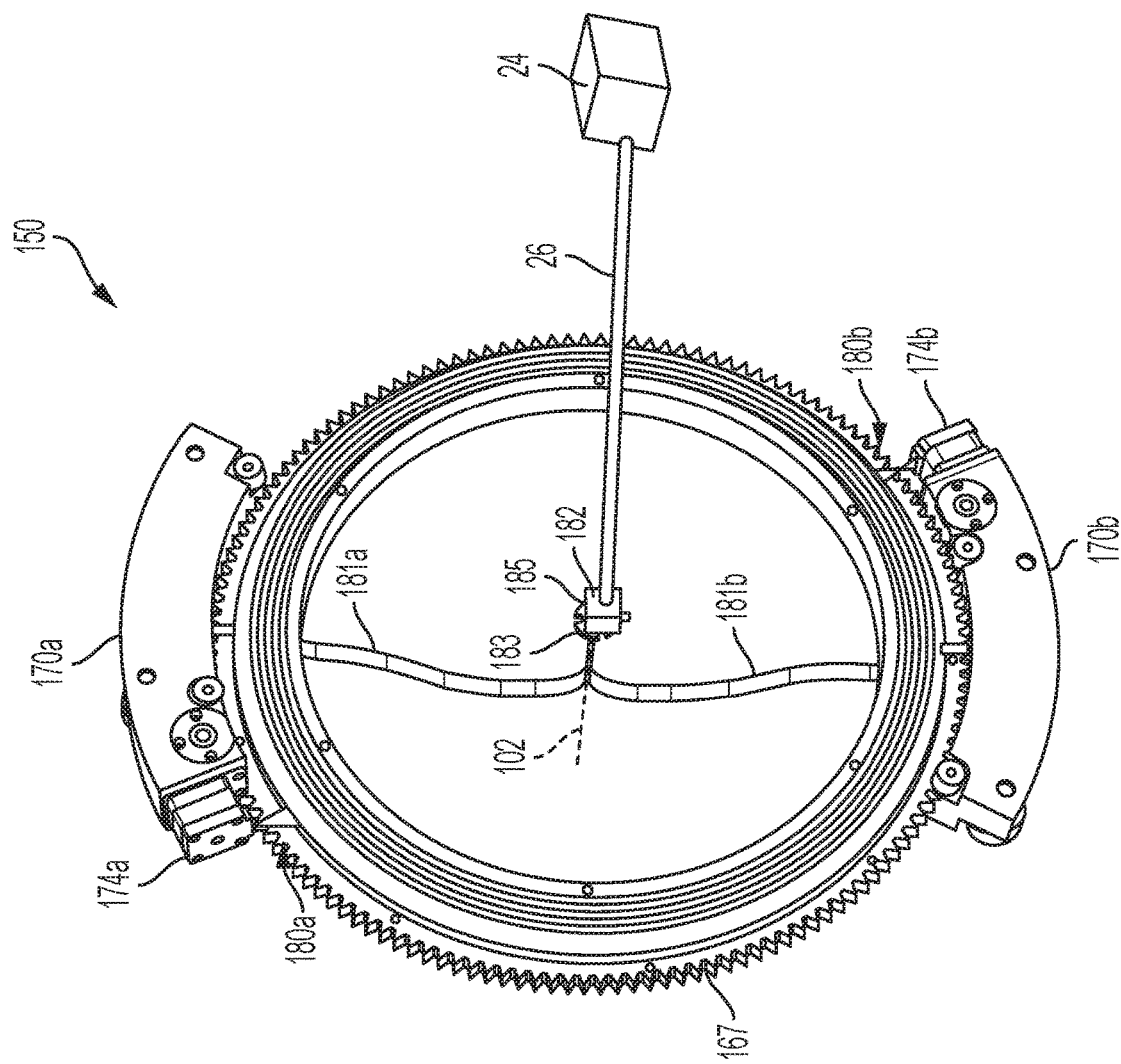
FIG. 4 schematically illustrates a dynamic balancing assembly in isolation from the tub and drum assembly of FIGS. 2A and 2B, according to one or more embodiments shown and described herein.

As noted above, motion of the first and second counterweight devices 170a, 170b may be responsive to communications from the control unit 24. The control unit 24 may communicate with the first and second counterweight devices 170a, 170b through wireless or wired communications. Orbital movement of the first and second counterweight devices 170a, 170b may make maintaining wired communication difficult due to twisting and tangling of the wires. An alternative approach is brushed commutation with slip rings or brushes and commutators. Brushed approaches face challenges with corrosion and wear especially in a wet environment. Wired connections can be made fully hermetic and impervious to moisture if the cable management challenges can be overcome. One approach may be to use one or more clock springs. For example, the one or more clocksprings may include first and second clocksprings 180a, 180b that communicatively couple the first and second counterweight devices 170a, 170b to the control unit 24 (illustrated in FIG. 1). The first and second clocksprings 180a, 180b may be positioned concentrically with the orbital balancing passage 152. FIG. 4 illustrates the first and second clocksprings 180a, 180b, the first and second counterweight devices 170a, 170b, and the ring gear 167 in isolation from the rest of the dynamic balancing assembly 150. The first and second clocksprings 180a, 180b may be axially displaced along the primary axis 102 to allow independent orbital motion of the first and second clocksprings 180a, 180b.

In the illustrated embodiment, the first clockspring 180a is coupled to the first counterweight device 170a and the second clockspring 180b is coupled to the second counterweight device 170b. Clocksprings may be characterized in that they generally include a flat cable wound in a coiled (spiral) shape. Each of the first and second clocksprings 180a, 180b may include, for example, an electrical cable with one more electrical conductors to communicate electrical signals and voltage. For example, a ribbon cable may be suitable for clockspring construction. Each clockspring 180a, 180b may communicate power and motor signals to driving motors 174a, 174b to move the first and/or second counterweight devices 170a, 170b along the orbital balancing passage 152 to adjust an angular position of the first and/or second counterweight devices 170a, 170b around the primary rotation axis 102. In embodiments, the clocksprings 180a, 180b may also communicate position feedback and/or other sensor signals from the orbiting counterweight devices 170a, 170b back to the control unit 24. Sensors included in or on the orbiting counterweights devices 170a, 170b may include, but are not limited to, force sensors, vibration sensors, temperature sensors, position feedback sensors, accelerometer sensors, etc.

As the first and second counterweight devices 170a, 170b orbit about the ring gear 167, the coil winds tighter or loosens depending on the direction of travel while maintaining the electrical connection. A clockspring has limited range of angular travel. At the end of travel the coil cannot accommodate additional relative angular motion between the inside and outside of the coil. Clocksprings according to the present disclosure may accommodate one or more revolutions of angular travel (e.g., two or more revolution, 3 or more revolutions, four or more revolutions, four of fewer revolutions, etc.). The control unit 24 may execute logic to ensure that the first and second counterweight devices 170a, 170b are only able to make a certain number of revolutions or move a certain degree around the orbital balancing passage 152 to not exceed the angular travel possible for the clocksprings 180a, 180b. This may avoid stretching or damaging the cable and maintains electrical connection between the counterweight devices 170a, 170b and control unit 24. After the spin cycle and balancing is complete, the position of both first and second counterweight devices 170a and 170b can be returned to a home position that is, for example, in the middle of angular travel range for the first and second clocksprings 180a and 180b.

Referring again to FIG. 2C, the orbital balancing passage 152 may further define a clockspring chamber 168 positioned radially inward from the first orbital chamber 160. Each of the first and second clocksprings 180a, 180b may be positioned within the clockspring chamber 168. To connect to the first and second counterweight devices 170a, 170b, lead wires from the first and second clocksprings 180a, 180b may extend through the gap 169 to be coupled to the respective first and second counterweight devices 170a, 170b.

As noted above, the orbital balancing passage 152 (including the first orbital chamber 160 and the clockspring chamber 168) may be directly coupled to the base wall section 136 or may be coupled to the base wall section 136 by support plate 156. The support plate 156 may extend along the base wall section 136 and be shaped to conform to a shape of the protruding portion 138 and the recessed portion 137. That is, the support plate 156 may be coextensive along the at least a portion of the base wall section 136. The support plate 156 may be coupled to the base wall section 136 through any coupling techniques (e.g., welding, brazing, fastening, etc.) or may be integrally formed therewith.

An extending portion 155 of the support plate 156 may separate from the base wall section 136 at a transition point 153 where the base wall section 136 transitions to a sidewall section 158 via a curved wall section 157. The extending portion 155 may be perpendicular to the sidewall section 158 of the drum 130. The extending portion 155 may extend to a diameter that is larger than a maximum diameter of the sidewall section 158 of the drum 130. However, in some embodiments, the extending portion 155 may be equal to or less than a maximum diameter of the sidewall section 158 of the drum 130. In the illustrated embodiment, the orbital balancing passage 152 may be arranged at the distal end of the extending portion 155 to maximize the applied moment provided by the first and second counterweight devices 170a, 170b. The orbital balancing passage 152 may enclose both the first and second counterweight devices 170a, 170b, and the first and second clocksprings 180a, 180b between the orbital balancing passage 152 and the support plate 156.

As noted above, the drum 130 may be operatively coupled to the motor 140 via a drive shaft 144 defining the primary rotation axis 102. In embodiments, the drive shaft 144 may be integrally formed within the support plate 156 of the drum 130. In other embodiments, the drive shaft 144 may be fixedly coupled to the support plate 156 or directly fixedly coupled to the drum body 132 via any coupling technique (e.g., welding, brazing, fastening, etc.). It is noted that lead wires from the first and second clocksprings 180a, 180b may be routed through openings in the support plate 156 and through a center opening 145 of the drive shaft 144 with communication to the control unit 24 (illustrated in FIGS. 1A and 4). The lead wires 181a, 181b from an inner coil of the first and second clocksprings 180a, 180b may be connected to a rotational commutation device 182. One side or the rotating end 183 of the rotational commutation device 182 may rotate with the drum 130 and may be installed at a back end of the drive shaft 144. The other side or the non-rotating end 185 of the rotational commutation device 182 does not rotate with the drum 130 and may be connected to the tub 110 or exterior housing 20. The rotational commutation device 182 communicates multiple paths of electrical current from multiple conductors of lead wires to communicate power and sensor signals between the rotating and non-rotating components of the laundry apparatus 10. The rotational commutation device 182 may be a slip ring, brushed commutator, inductive commutator, etc. Lead wires 26 from the non-rotating end of the rotational commutation device 182 can connect to the control unit 24. The control unit 24 may include a drive amplifier (not shown) or other electronic circuits to provide power to the driving motors 174a, 174b through the first and second clocksprings 180a, 180b to adjust angular position of the first and second counterweight devices 170a, 170b. The rotational commutation device 182 can also communicate sensor signals from devices in the rotating drum 130 such as counterweight device position sensors, homing sensors, temperature sensors, force sensors, vibration sensors, load imbalance sensors 146, and accelerometers to the control unit 24 for processing. The rotational commutation device 182 can alternatively communicate power and control signals to an intermediate drive amplifier that may rotate with the drum 130 and is connected to the first and second counterweight devices 170a, 170b by the first and second clocksprings 180a, 180b.

Referring now to the first and second counterweight devices 170a, 170b, the first and second counterweight devices 170a, 170b are configured to be controllably moved about the orbital balancing passage 152 to balance an imbalanced laundry load within the laundry apparatus 10. For example, the first and second counterweight devices 170a, 170b may have a combined mass that is sufficiently large to balance a moment of a combined full design capacity laundry load saturated with a washing fluid. The first and second counterweight devices 170a, 170b can be constructed of a high density material such as steel, cast iron, tungsten, bronze, brass, lead, nickel, copper, aluminum, concrete, ceramic, glass, etc to minimize the volume occupied by the first and second counterweight devices 170a, 170b and the orbital balancing passage 152. As will be described in greater detail below, the first counterweight device 170a and the second counterweight device 170b may be cooperatively controlled by the control unit 24 in response to detecting the load imbalance in the drum 130 based on the load imbalance signal output by the one or more load imbalance sensors 146.

Figure 5A:
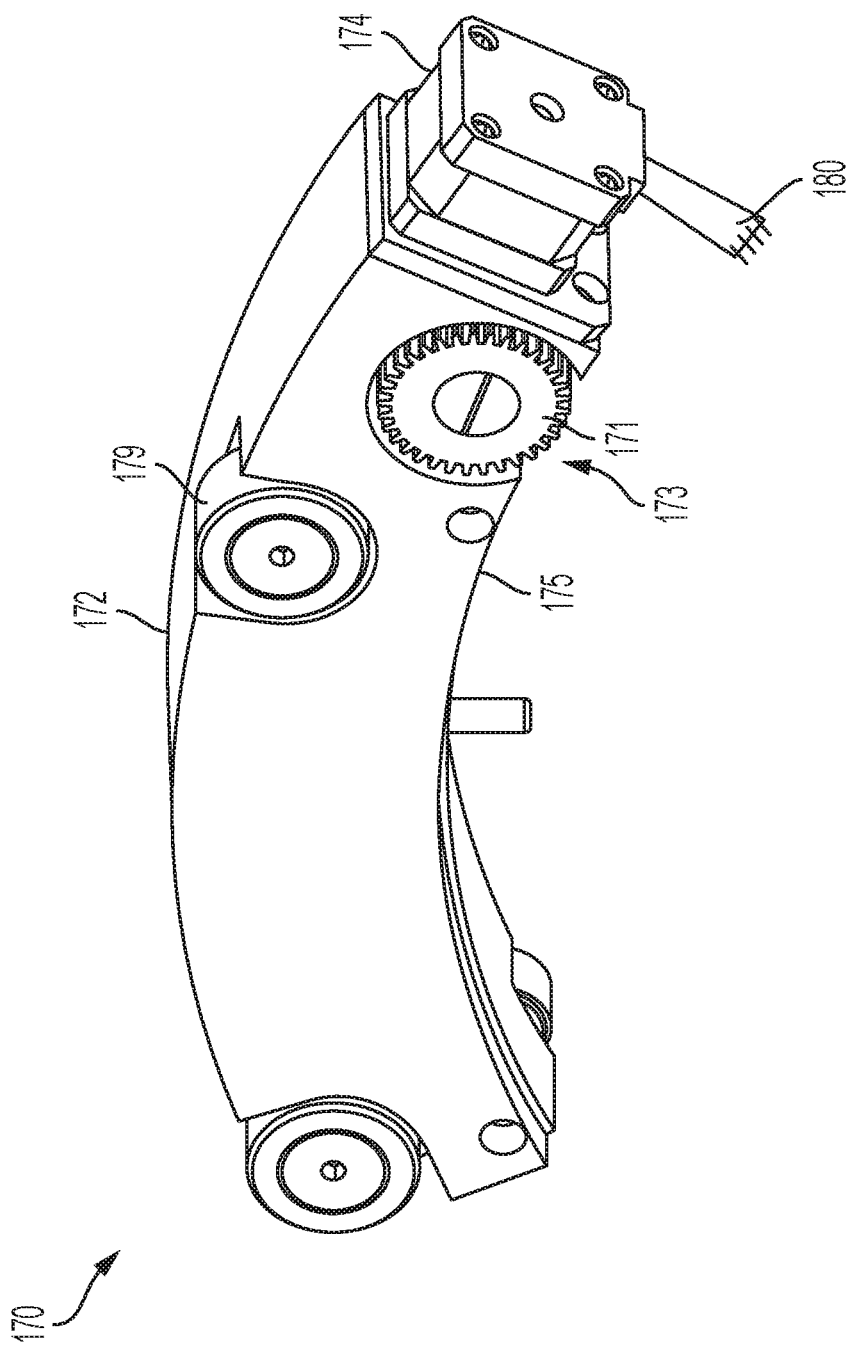
FIG. 5A schematically depicts a counterweight device of the dynamic balancing assembly of FIG. 4, according to one or more embodiments shown and described herein.
Figure 5B:
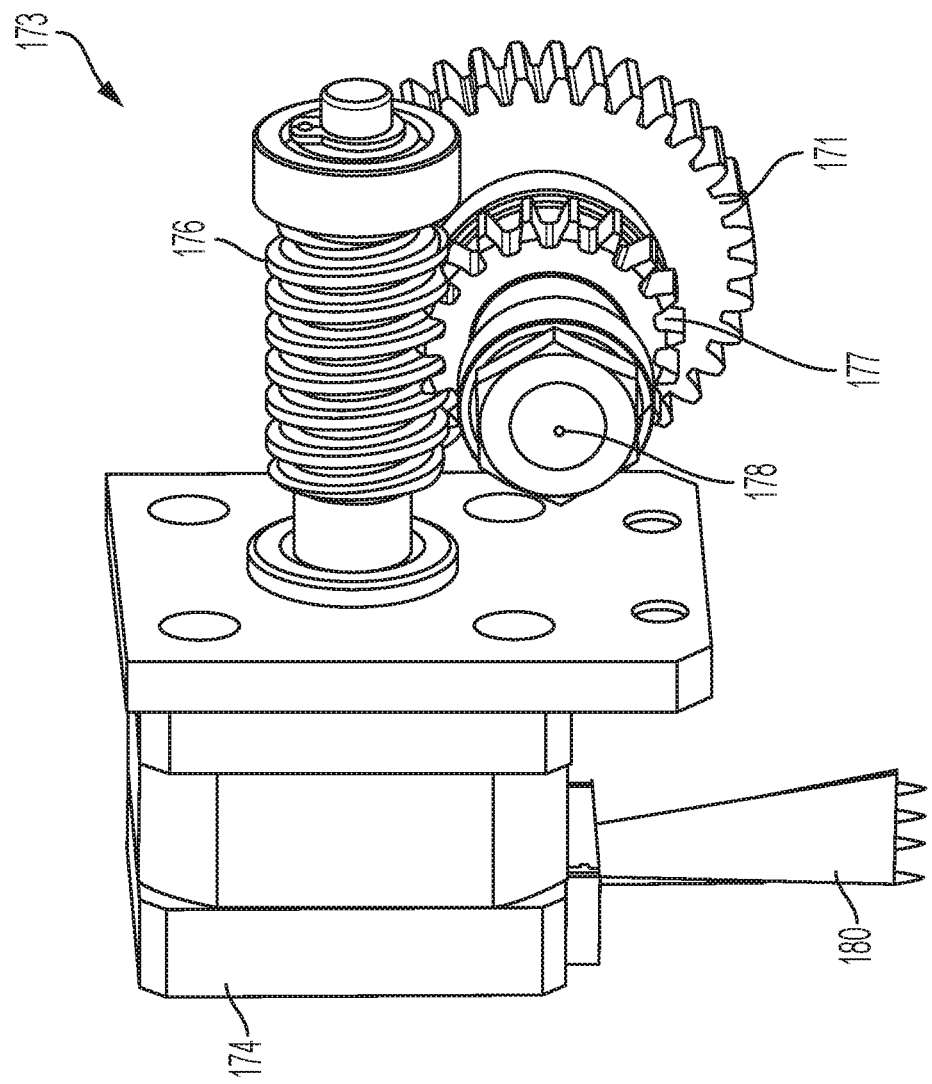
FIG. 5B schematically depicts an interior perspective view of a worm gear drive within the counterweight device illustrated in FIG. 5A.

FIGS. 5A and 5B illustrates a counterweight device 170 in isolation from the tub and drum assembly 100. Each of the first and second counterweight devices 170a, 170b may be substantially identical to the counterweight device 170 illustrated in FIGS. 5A and 5B. Referring particularly to FIG. 5A, the counterweight device 170 may include a curved body 172 shaped to travel through the orbital balancing passage 152. The curved body 172 may house one or more weights (not shown). Coupled to the curved body 172 may be a driving motor 174, which is communicatively coupled to the control unit 24 (shown in FIGS. 1A and 4) through the clock spring 180.

Referring to FIG. 5B which illustrates a driving assembly 173 of the counterweight device 170, the driving motor 174 may drive a worm gear 176. The driving motor 174 more be a reversible motor so as to be able to drive the counterweight device 170 in both a clockwise direction and a counterclockwise direction about the orbital balancing passage 152. The worm gear 176 may be meshed with a worm wheel 177 that is mounted to a rotational axis 178. Also mounted to the rotational axis 178 is a pinion gear 171. That is, the pinion gear 171 may share a common rotational axis 178 with the worm wheel 177 such that rotation of the worm wheel 177 rotates the pinion gear 171. Referring again to FIG. 5A, the pinion gear 171 is positioned at an edge 175 of the curved body 172 so as to be able to mesh with the ring gear 167 (illustrated in FIG. 4). Accordingly, rotation of the worm gear 176 by the driving motor 174 causes the pinion gear 171 to rotate, which causes the counterweight device 170 to traverse the ring gear 167 and the orbital balancing passage 152.

The counterweight device 170 may further include one or more wheels 179 positioned along the counterweight body the counterweight wheel may be arranged to contact the orbital balancing passage 152 and/or the retention device when positioned within the orbital balancing passage 152. The one or more wheels 179 may be freely rotatably. In other embodiments, the one or more wheels 179 may be driven wheels (e.g., via a driving motor 174). Alternatively the wheels 179 can be replaced with bushings or bearings that allow relative motion at reduced friction between the counterweight device 170 and the orbital balancing passage 152.

Referring again to FIG. 2C, when assembled, a cross-sectional plane 190, passing through the laundry apparatus 10 at a position orthogonal to the primary rotation axis 102, passes through dynamic balancing assembly 150 (e.g., the first counterweight device 170a, the second counterweight device 170b, or a combination thereof), the motor 140, the fluid containment envelope 113, and the first inset wall 119 of tub 110. Note that while the cross-sectional plane 190 can pass through both the motor 140 and dynamic balancing assembly 150, the motor is isolated from washing fluid by the first inset wall 119 of tub 110. The dynamic balancing assembly 150 is directly connected to the drum 130 which allows effective counterbalancing to an imbalance caused by the center of mass 61 of laundry 60 and the first and second counterweight devices 170a, 170b. Because of the inset wall 119 of tub 110, the back of the motor 140 may, in some embodiments, be substantially flush with or closely proximate to a plane defined by a rear surface of the dynamic balancing assembly 150 instead of the back of the motor 140 being substantially offset from the back of the dynamic balancing assembly 150 which may cause the rear wall of the exterior housing 20 to increase in depth or to reduce the depth of the drum 130 and reduce the volume of the laundry receiving portion 133. In embodiments wherein the first and second counterweight devices 170a, 170b are positioned in parallel but separate planes, the cross-sectional plate may only pass through one of the first counterweight device 170a or the second counterweight device 170b. The cross-sectional plane 190 may additionally pass through at least one or the first clockspring 180a and the second clock spring 180b. Accordingly, the present design provides for a more efficient use of space within the tub 110 and the laundry apparatus 10 by aligning various components along a common plane 190. Such alignment allows for a greater amount of space to be reserved for the laundry-receiving portion 133 of the drum 130.

Referring again to FIGS. 1 and 2A-2C, to provide for dynamic balancing of the laundry apparatus 10, the laundry apparatus 10 may further include one or more load imbalance sensors 146 communicatively coupled to the control unit 24 and configured to output a load imbalance signal to the control unit 24. The load imbalance signal may be indicative of a load imbalance within the drum 130. For example, the load imbalance signal may be indicative of an angular position and a magnitude of the load imbalance within the drum 130. The one or more load imbalance sensors 146 may be mounted anywhere in the laundry apparatus 10 and attuned to detect balance conditions within the drum 130. For example, the one or more dynamic balancing sensors may include accelerometers and/or motor rotational position sensors to determine a center of mass within the load of laundry to determine if a load imbalance is present. Another embodiment may use motor torque sensors and motor rotational position sensors to determine a center of mass within the load of laundry to determine if a load imbalance is present. In yet further embodiments, force sensors may be used along with motor rotation position sensors to determine a center of mass within the load of laundry to determine if a load imbalance is present. Other sensors may include vibrational sensors or the like to determine the presence of a load imbalance. The load imbalance sensors 146 can detect relative and/or absolute variations in displacement, velocity, and/or acceleration of components of the laundry appliance 10. For instance, a displacement-based load imbalance sensor 146 can measure small changes of displacement between the tub 110 and exterior housing 20 caused by an imbalanced load. In another example, an acceleration-based load imbalance sensor may measure fluctuations of acceleration of an accelerometer mounted to the tub 110. In some embodiments, load imbalance may also be sensed by measuring change in force, torque, or strain between components of the laundry appliance 10. In further embodiments, load imbalance may also be measured by monitoring the current to motor 140. In yet further embodiments, load imbalance can also be determined based on acoustic analysis of noise during operation.

The angular position of the combined center of mass 63 relative to the primary rotation axis 102, as illustrated in FIGS. 1C and 1D, can be determined by measuring the angular position of the center of mass 61 of the laundry 60. This is measured relative to a reference angular position 52 of the drum 130. The reference angular position 52 of the drum 130 may be measured by a drum rotation sensor such as a magnetic or optical proximity sensor, a hall effect sensor, an encoder, resolver, etc. The reference angular position 52 of the drum 130 may, in some embodiments, be measured by motor position sensors. The angular position for center of mass 61 of the laundry 60 may be measured by the load imbalance sensor 146 relative to the reference angular position 52 of the drum 130. Signals from the load imbalance sensor 146 can be analyzed in the time domain or alternatively in the frequency domain. Additionally, a magnitude of the imbalance signal from the load imbalance sensor 146 may be used to estimate the equivalent lumped mass at the center of mass 61 for laundry 60. For example, the total mass of laundry 60 may be measured directly by load cells or strain gauge sensors. In some embodiments, the total mass of the laundry 60 may be calculated based on inertia of the laundry measured by accelerating or decelerating the spinning of the drum 130. Control unit 24 may periodically or continuously calculate an estimate for magnitude and angle of imbalance to be countered by adjusting angular positions of the first and second counterweight devices 170a, 170b. The amount of adjustment of the first and second counterweight devices 170a, 170b may be calculated by the control unit 24 so as to move the combined center of mass 63 of the laundry 60, the first counterweight device 170a, and the second counterweight device 170b, to cause the combined center of mass 63 to be substantially coincident with the primary rotation axis 102 and eliminate or substantially reduce the vibrations that would result from a load imbalance. In embodiments, the control unit may not calculate an amount of adjustment for the first and second counterweight devices 170a, 170b. Instead, the control unit may adjust the first and second counterweight devices 170a, 170b using a differential "trial and error" solution where angular positions 53a, 53b are adjusted until imbalance is reduced and eliminated. Another control strategy can employ a combination of a mathematical control scheme with fine tuning adjustments to further reduce imbalance signal.

Figure 6:
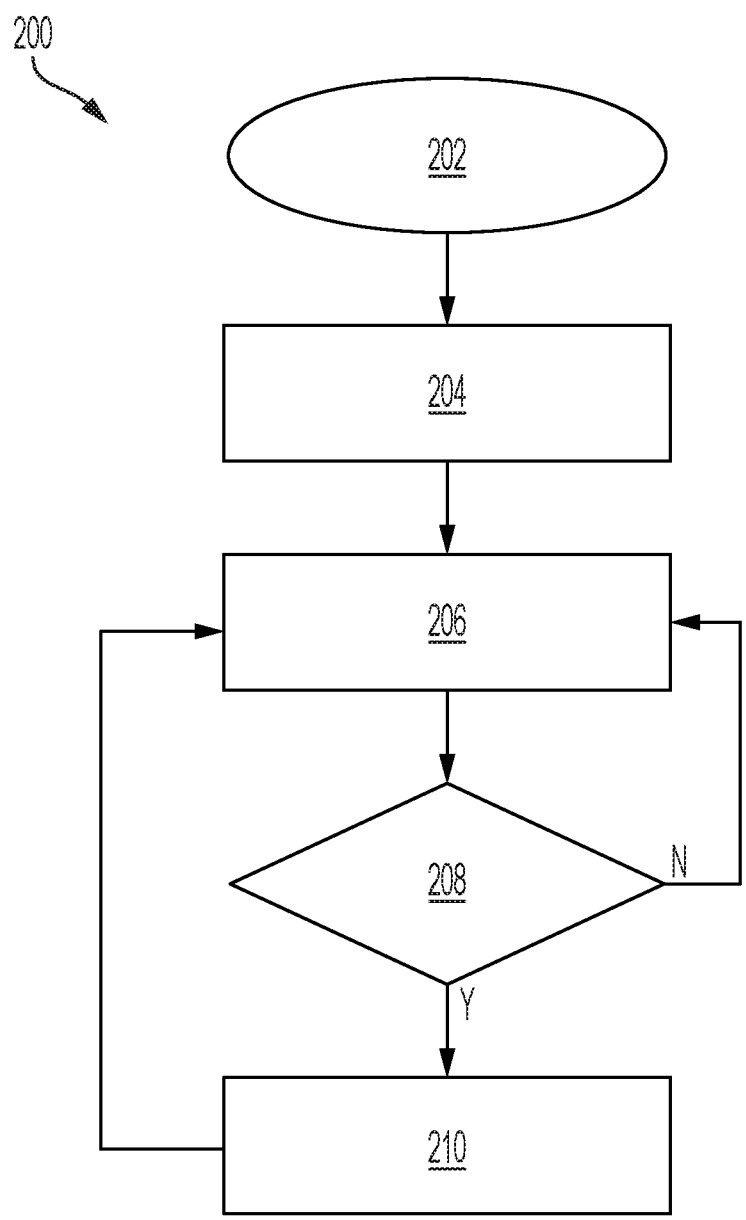
FIG. 6 depicts a flowchart illustrating a method of balancing a laundry apparatus, according to one or more embodiments shown and described herein.

FIG. 6 illustrates a flowchart depicting a method 200 for balancing the laundry apparatus 10 as described herein. The method 200 may start at step 202 and may include loading laundry within the laundry apparatus 10 and starting the laundry apparatus 10. At step 204, the method 200 includes rotating the drum 130. At step 206, the method 200 may further include receiving with the control unit 24, a load imbalance signal output by the one or more load imbalance sensors 146. At step 208, the method 200 includes detecting, with the control unit 24, a load imbalance signal output by the one or more load imbalance sensors 146 and determining whether a load imbalance is present within the drum 130 based on the load imbalance signal. Where a load imbalance is not detected, the method 200 may include monitoring the load for the load imbalance signal. Where a load imbalance is detected, the method 200 further includes, at step 210, controlling the dynamic balancing assembly 150 to controllably move the first counterweight device 170a positioned within the orbital balancing passage 152 to adjust an angular position of the first counterweight device 170a around the primary rotation axis to counteract a detected load imbalance in the drum 130 and controllably move the second counterweight device 170b positioned within the orbital balancing passage 152 with the control unit 24 to adjust an angular position of the second counterweight device 170b around the primary rotation axis to counteract the detected load imbalance in the drum 130. The control unit 24 may continue to monitor the laundry apparatus 10 for further load imbalances. In embodiments, the control unit 24 may only detect load imbalances and initiate movement of the first and second counterweight devices 170a, 170b during certain laundry cycles (e.g., the spin cycle). For example, the method may include monitoring the drum 130 with the one or more load imbalance sensors 146 continuously during acceleration from a satellite speed (e.g., a base operating speed sufficient for the centripetal acceleration to exceed gravitation acceleration) to a maximum water extraction speed (e.g., 800 RPM or greater, 1,000 RPM or greater, etc.).

The dynamic balancing assembly 150 illustrated in FIG. 2C, is illustrative of a single plane balancer where in the counterweight devices 170a, 170b are located on a single plane (i.e., within the same plane) perpendicular to the primary rotation axis 102. Single plane balancing may be effective in many instances. In particular, single plane balancing is effective when the depth of the drum 130 is relatively shallow such that the center of mass 61 for laundry 60 is in proximity with the plane of the counterweight devices 170a, 170b. Single plane balancing may also be particularly effective when the geometry of the drum 130 causes the center of mass 61 for laundry 60 to remain in proximity with a plane in which the counterweight devices 170a, 170b are supported. Tilting the primary rotation axis 102 so that the back of the drum 130 with the dynamic balancing assembly 150 is lower than the front of the drum 130 could cause the laundry 60 to slide toward the back of the drum due to gravitational acceleration so as to be closely positioned to the dynamic balancing assembly 150.

However, in other embodiments, counterweight devices can be located within two or more planes perpendicular to the primary rotation axis 102. Two plane dynamic balance may be accomplished by configuring the tub and drum assembly 100 to include two or more dynamic balancing assemblies 150. The two or more dynamic balancing assemblies 150 may be provided with some axial separation along the primary rotation axis 102. Each of the two or more dynamic balancing assemblies 150 will be coincident with a plane oriented perpendicular to the primary rotation axis 102. Two plane balancing may be additionally effective at eliminating imbalances created when the center of mass 61 of the laundry 60 is not in proximity with a single plane supporting the counterweight devices 170. Two plane balancing can be useful when the depth of the drum 130 is deep (e.g., depth of the drum to diameter ratio is greater than 1) and the center of mass 61 of the laundry cannot be moved proximate to a single plane supporting the counterweight devices during operation.

FIGS. 7A-7H show some schematic illustrative embodiments of tub and drum assemblies 100 with various configurations including two or more dynamic balancing assemblies 150. FIG. 7A illustrates a tub and drum assembly 100 with a cantilevered drum 130 configured for single plane balancing with a single dynamic balancing assembly 150 mounted to the rear of the drum 130, such as discussed in greater detail above. The cantilevered drum 130 employs a main bearing assembly 159, such as illustrated in FIG. 1C at the rear of the drum. A motor 140 is coupled to the rear of the drum and mounted concentrically inset relative to the dynamic balancing assembly 150.

FIG. 7B illustrates a tub and drum assembly 100 with a cantilevered drum 130 configured for two plane balancing with a first dynamic balancing assembly 150a mounted to the rear of the drum 130 and a second dynamic balancing assembly 150b mounted to the front of the drum 130. A Motor 140 is coupled to the rear of the drum 130 and mounted concentrically inset relative to the first dynamic balancing assembly 150a.

FIG. 7C illustrates a tub and drum assembly 100 with a cantilevered drum 130 configured for two plane balancing with a first dynamic balancing assembly 150a mounted to the rear of the drum 130 and a second dynamic balancing assembly 150b mounted to the inside rear of the drum 130. A Motor 140 is coupled to the rear of the drum 130 and mounted concentrically inset relative to the first dynamic balancing assembly 150a.

FIG. 7D illustrates a tub and drum assembly 100 with a cantilevered drum 130 configured for two plane balancing with a first dynamic balancing assembly 150a mounted to the rear of the drum 130 and a second dynamic balancing assembly 150b mounted behind the first dynamic balancing assembly 150a. A motor 140 is coupled to the rear of the drum 130 and mounted concentrically inset relative to the first and second dynamic balancing assemblies 150a, 150b.

FIG. 7E illustrates a tub and drum assembly 100 with a simply supported drum 130 (e.g., supported at both the front end and the rear end of the drum) configured for single plane balancing with a single dynamic balancing assembly 150 mounted to the rear of the drum 130. The simply supported drum 130 may employ main bearing assemblies (not shown) at the rear and front of the drum 130. A motor 140 is coupled to the rear of the drum 130 and mounted concentrically inset relative to the dynamic balancing assembly 150.

FIG. 7F illustrates a tub and drum assembly 100 with a simply supported drum 130 configured for two plane balancing with a first dynamic balancing assembly 150a mounted to the rear of the drum 130 and a second dynamic balancing assembly 150b mounted to the front of the drum 130. Motors 140a, 140b are coupled to the rear and front of the drum 130 and mounted concentrically inset relative to respective first and second dynamic balancing assemblies 150a, 150b.

FIG. 7G illustrates a tub and drum assembly 100 with a simply supported drum 130 configured for two plane balancing with a first dynamic balancing assembly 150a mounted to the rear of the drum 130 and a second dynamic balancing assembly 150b mounted to the front of the drum 130. A Motor 140 is coupled to the rear of the drum and mounted concentrically inset relative to the first dynamic balancing assembly 150a.

FIG. 7H illustrates a tub and drum assembly 100 with a simply supported drum 130 configured for two plane balancing with a first dynamic balancing assembly 150a mounted to the rear of the drum 130 and a second dynamic balancing assembly 150b mounted behind the first dynamic balancing assembly 150a. A Motor 140 is coupled to the rear of the drum and mounted concentrically inset relative to the first and second dynamic balancing assemblies 150a, 150b.

Alternatively for the embodiments illustrated in FIGS. 7A-7H, a passive dynamic balancing assembly such as a simple fluid and weighted ball filled balancing ring could be used in place of an active dynamic balancing assembly controlled by a control unit. Alternatively for the embodiments illustrated in FIGS. 7A-7H, the dynamic balancing assembly 150 could use means for dynamically balancing other than adjusting angular position of counterweight devices 170. Some alternative embodiments may include counterweights having an adjustable radial position from primary rotation axis 102, variable mass bodies such as fluid or powder filled bladders or cylinders, orbital masses that can shift off-center from primary rotation axis 102, rings filled with weighted balls with adjustable orbital position by magnetic attraction, etc.

Referring now to FIGS. 8A and 8B, the tub and drum assembly 100 is located inside of the exterior housing 20 of a laundry apparatus 10. The tub 110 may be attached to the exterior housing 20 via a displaceable suspension 30. The displaceable suspension 30 may include any tuned passive elements used to reduce vibrations or the effects thereof, including, but not limited to, springs 31, additional suspension mass(es) 32 attached to the tub, and dampers 33 designed to reduce transmittance of vibrations and absorb energy from spinning imbalanced laundry to the exterior housing 20, or the like. The displaceable suspension 30 allows the tub 110 to displace relative to the exterior housing 20. The displacement of the tub 110 may cause travel in any direction. For example the direction of travel can be in the radial direction or axial direction relative to the primary rotation axis 102. Significant displacement of the tub may absorb vibrations and dampen the motion of a vibrating tub and drum assembly 100. In some embodiments, the displaceable suspension 30 may include active members such as linear motors, torsional motors, dampers with magneto-rheological fluid, voice coil actuators, pneumatic actuators, magnetic actuators, etc. to dampen vibrations. Passive and active suspension members may rely on relative motion between the tub and drum assembly 100 and the exterior housing 20 to absorb vibrations transmitted to exterior housing 20.

A travel volume 35 surrounding the tub 110 may be delineated by a swept volume of the tub and drum assembly 100 following the maximum possible travel distance 34 in all directions. That is, the travel volume 35 may be space within the exterior housing left empty or free from obstructions between the tub 110 and exterior housing 20 to accommodate movement of the tub and drum assembly 100. The provide enough space for the travel volume 35, the interior of the exterior housing 20 may be significantly larger than the exterior dimensions of the tub 110. This may create a practical limitation to the size of the tub and drum assembly 100 and internal laundry capacity for a given exterior housing size. If the diameter of the tub and drum assembly 100 approaches the inside width or height of the exterior housing 20, the displaceable suspension 30 would have limited travel space available and would be unable to isolate vibration from the tub and drum assembly 100 to the exterior housing 20. Likewise, if the axial depth of the tub and drum assembly 100 approaches the inside depth of the exterior housing 20, the displaceable suspension 30 would have limited travel space available and would be unable to isolate vibration due to load imbalance from transmitting to the exterior housing 20.

The addition of a dynamic balancing assembly 150 described above to a laundry apparatus 10 using a displaceable suspension 30 can greatly reduce or eliminate the vibrations generated by the laundry imbalance. If the masses of the first and second counterweight devices 170a, 170b are not sized to balance the potential imbalance of the largest possible laundry load, then some imbalance can still be generated even with the dynamic balancing assembly 150 and the displaceable suspension 30 may dampen the remaining vibration through displacement of the displaceable suspension. The addition of the dynamic balancing assembly 150 may reduce the maximum travel distance 34 and can reduce the travel volume 35 needed to allow for the maximum travel. For example, the maximum travel distance for the tub and drum assembly 100 may be less than about 6 mm. In such embodiments, the dimensions of the tub and drum assembly 100 may be enlarged such that the travel volume 35 extends to an interior surface of the exterior housing 20. Stated another way, the tub and drum assembly 100 may be in much closer proximity to the exterior housing 20, so as to fill up more of the space within the exterior housing 20.

Figure 9B:
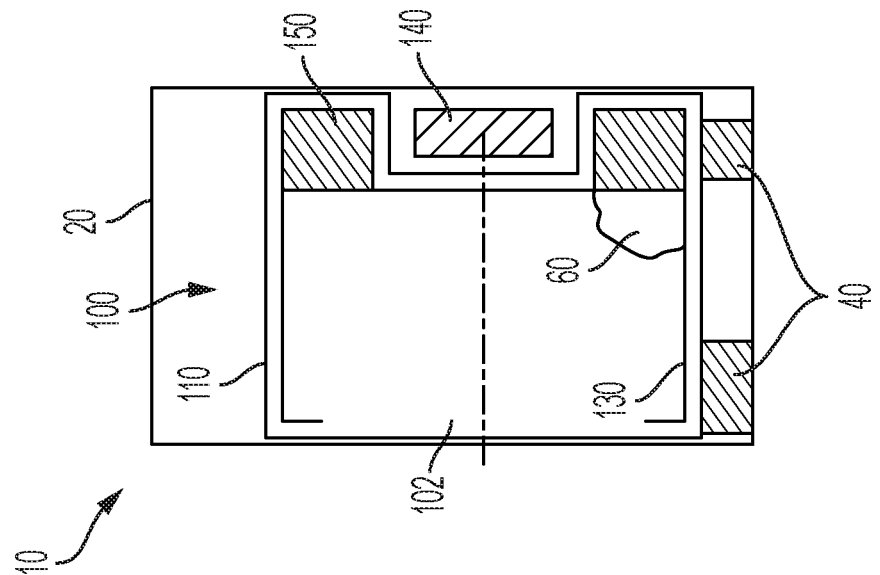
FIG. 9B illustrates a side cross-sectional view of the laundry apparatus of FIG. 9A, according to one or more embodiments shown and described herein.
Figure 9A:
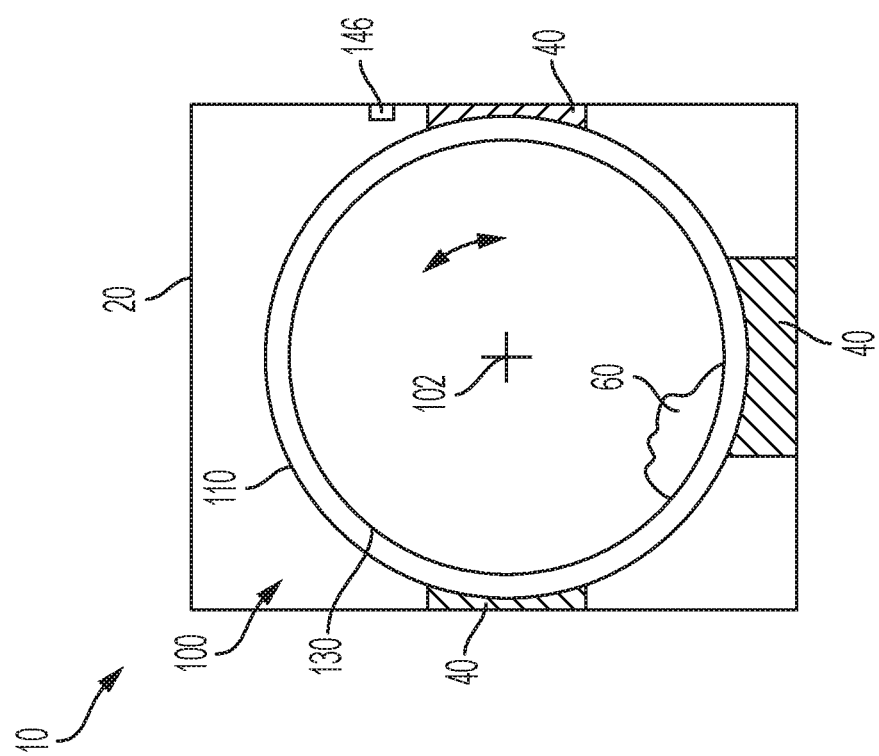
FIG. 9A illustrates a front cross-sectional view of a laundry apparatus with a tub and drum assembly mounted to an exterior housing through one or more tub mounts, according to one or more embodiments shown and described herein.

A dynamic balancing assembly 150 can greatly reduce or eliminate vibration transmitted to the laundry apparatus 10 from laundry imbalance. Elimination of imbalance and vibration can allow construction of a laundry apparatus 10 without a displaceable suspension 30. Referring to FIGS. 9A and 9B, the tub and drum assembly 100 may be located inside of the exterior housing 20 of a laundry apparatus 10 by attaching the tub 110 to the exterior housing 20 with one or more tub mounts 40 or a plurality of tub mounts. The tub mounts 40 include of a plurality of various mounting interfaces to attach the tub 110 to the exterior housing 20. The tub mounts 40 may be components separate from the tub 110 and exterior housing 20 or may be integral to the tub 110 and/or the exterior housing 20. The tub mounts 40 can include any rigid or stiff material that has minimal displacement during loading of laundry 60 into drum 130. The tub mounts 40 may alternatively provide some compliance and may allow minimal displacement (e.g., for example a maximum displacement of 6 mm or less with 25 lb force applied). Compliant tub mounts 40 may be constructed using vibration isolators, elastomeric motor mounts, stiff springs (e.g., a spring having a maximum extension/contraction of 6 mm or less), fluid filled motor mounts, etc. The tub mounts 40 may be produced from any material including, but not limited to a polymer, elastomeric, metallic components, or any combination thereof. The tub mounts 40 can be attached by bolts, screws, rivets, adhesive, welding, etc.

A dynamically balanced tub and drum assembly 100 with dynamic balancing assembly 150 supported by tub mounts 40 may be substantially free from vibration during operation such that the tub 110 will not substantially move relative to the exterior housing 20. A balanced tub and drum assembly 100 without a displaceable suspension 30 may not require any of the travel volume 35 or a greatly reduced travel volume and will allow the tub and drum assembly 100 to fully occupy the interior volume of the exterior housing 20. Given the same dimensions of exterior housing 20, the tub and drum assembly 100 without a displaceable suspension 30 may be significantly larger than the tub and drum assembly 100 with a displaceable suspension 30. The larger tub and drum assembly may have more interior volume in the laundry receiving portion 133 and may accommodate more laundry 60. Similarly, given the same dimensions for the tub and drum assembly 100 and the same laundry 60 capacity, the exterior housing 20 without a displaceable suspension 30 can be significantly smaller than the exterior housing 20 with a displaceable suspension 30. Eliminating the displaceable suspension 30 by applying a dynamic balancing assembly 150 may allow for construction of a compact laundry apparatus with useful volume of laundry receiving portion 133 and laundry 60 capacity. Eliminating the displaceable suspension 30 by applying a dynamic balancing assembly 150 may also allow for construction of a standard size laundry apparatus with superior volume of laundry receiving portion 133 and laundry 60 capacity.

It may be impractical to construct a compact laundry apparatus with very small external housing dimensions if the tub and drum assembly 100 are supported by a displaceable suspension 30 that accommodates a maximum travel of 25.4 mm, as the resulting laundry capacity may be very small. It is especially impractical to construct a compact laundry apparatus with an external housing 20 of a very small depth (e.g., 32 cm or less) if the tub and drum assembly 100 are supported by a displaceable suspension 30 with a maximum travel of 25.4 mm as the resulting laundry capacity would still be very small. TABLE 1 compares drum internal volume and drum dimensions for four different laundry apparatus configurations having varying exterior housing dimensions compared with and without a displaceable suspension. The radial and axial travel for the examples are is about 2.5 cm. The laundry apparatus configurations with the dynamic balancing assembly 150 and no suspension has larger drum 130 volume by 37.4%-92.7%.

TABLE 1

Dimension Comparison with and without Dynamic Balancing Assembly

| | | | With Suspension with 25.4 mm Travel | | | With Dynamic Balancing Assembly and No Suspension | | |
|---|---|---|---|---|---|---|---|---|
| Housing Outer Width (mm) | Housing Outer Height (mm) | Housing Outer Depth (mm) | Drum Internal Depth (mm) | Drum Internal Diameter (mm) | Drum Volume (liter) | Drum Internal Depth (mm) | Drum Internal Diameter (mm) | Drum Volume (liter) |
| 610 | 762 | 305 | 102 | 483 | 19 | 152 | 533 | 34 |
| 610 | 762 | 406 | 203 | 483 | 37 | 254 | 533 | 57 |

TABLE 1-continued

Dimension Comparison with and without Dynamic Balancing Assembly

| Housing Outer Width (mm) | Housing Outer Height (mm) | Housing Outer Depth (mm) | With Suspension with 25.4 mm Travel | | | With Dynamic Balancing Assembly and No Suspension | | |
|---|---|---|---|---|---|---|---|---|
| | | | Drum Internal Depth (mm) | Drum Internal Diameter (mm) | Drum Volume (liter) | Drum Internal Depth (mm) | Drum Internal Diameter (mm) | Drum Volume (liter) |
| 610 | 762 | 610 | 406 | 483 | 74 | 457 | 533 | 102 |
| 508 | 610 | 305 | 102 | 381 | 12 | 152 | 432 | 22 |

In some embodiments, instead of maximizing drum volume, the additional space provided by eliminating the displaceable suspension and/or the travel volume may be used for packing various internal laundry apparatus components 41 inside the volume of a laundry apparatus 10. Traditionally, packaging internal laundry apparatus components has been challenging especially when the exterior housing 20 has compact dimensions or if the laundry apparatus is a combination washer/dryer. Referring to FIGS. 10A and 10B, the tub and drum assembly 100 is located inside of the exterior housing 20 of a laundry apparatus 10 by attaching the tub 110 to the exterior housing 20 with a tub mounts 40, as described above. As noted above, the tub and drum assembly 100 with dynamic balancing assembly 150 may be constructed without a displaceable suspension and will not require any travel volume or only a small travel volume (e.g., 6 mm or less radially in any direction and 6 mm axially). If the exterior dimensions of the tub and drum assembly 100 are smaller than the internal dimensions inside the exterior housing 20, the volume between the tub and drum assembly 100 and the exterior housing 20 may be used for placement of laundry apparatus components 41. Laundry apparatus components 41 can include, but are not limited to, pumps, water hoses, air ducts, water storage sumps, power supplies, control units, electronic circuitry, sensors, air heaters, water heaters, drying components, condensation equipment, refrigeration components, moisture storage components, vessels for storage of water. Storage of detergent and chemicals, detergent and chemical dispensers, fans, storage of hoses, hose reels, casters, etc. Substantial elimination of the travel volume 35 of the tub 110 allows design of a laundry apparatus 10 with a high volume capacity for the laundry-receiving portion 133 and volume to install internal laundry apparatus components 41. For example, positions in which the tub and drum assembly 100 is closest to the various surfaces (e.g., front, back, top, bottom, or sidewall), may define pinch points PP. Without using the active balancing assembly 150, a displaceable suspension as illustrated in FIG. 8A may be necessary for damping vibrations. Accordingly, the travel volume 35 necessary to allow for movement of the displaceable suspension likely provides too little space for storage of laundry apparatus components 41 within the pinch points PP, whereas, and as illustrated in FIG. 10A, laundry apparatus components may be positioned in the pinch points PP, without encroaching on the space needed for the travel volume 35.

Embodiments can be described with reference to the following numbered clauses, with preferred features laid out in the dependent clauses.

1. A dynamic balancing assembly for a laundry apparatus, the dynamic balancing assembly comprising: a control unit; one or more counterweight devices configured to be orbited about a primary rotation axis of the laundry apparatus to counteract a load imbalance in a drum of the laundry apparatus; and one or more clocksprings communicatively coupling each of the one or more counterweight devices to the control unit.

2. The dynamic balancing assembly of clause 1, further comprising an orbital balancing passage arranged concentrically around the primary rotation axis of the laundry apparatus, the orbital balancing passage comprising: a first orbital chamber defining a passage within which the one or more counterweight devices are moveably positioned; and a clockspring chamber open to the first orbital chamber and housing the one or more clocksprings.

3. The dynamic balancing assembly of clause 2, wherein the clockspring chamber is positioned radially inward from the first orbital chamber.

4. The dynamic balancing assembly of any preceding clause, wherein the one or more clocksprings are positioned radially inward of the one or more counterweight devices.

5. The dynamic balancing assembly of any preceding clause, further comprising: one or more load imbalance sensors communicatively coupled to the control unit and configured to output a load imbalance signal to the control unit, the load imbalance signal being indicative of the load imbalance within the drum of the laundry apparatus; a first counterweight device positioned within the orbital balancing passage and responsive to the control unit, wherein the control unit controllably moves the first counterweight device along the orbital balancing passage to adjust an angular position of the first counterweight device around the primary rotation axis to counteract a detected load imbalance in the drum; and a second counterweight device positioned within the orbital balancing passage and responsive to the control unit, wherein the control unit controllably moves the second counterweight device along the orbital balancing passage to adjust an angular position of the second counterweight device around the primary rotation axis to counteract the detected load imbalance in the drum, and wherein the one or more clocksprings comprise a first clockspring communicatively coupling the first counterweight device to the control unit and a second clockspring communicatively coupling the second counterweight device to the control unit.

6. The dynamic balancing assembly of any preceding clause, wherein the one or more clocksprings accommodate angular travel of the one or more counterweight devices for one or more revolutions around the primary rotation axis.

7. The dynamic balancing assembly of any preceding clause, further comprising a rotational commutation device for communicatively coupling the one or more clocksprings to the control unit, wherein the rotational commutation device comprises a rotating end connected to lead wires from the one or more clocksprings and a non-rotating end coupled to the control unit through lead wires extending from the non-rotating end to the control unit.

8. A laundry apparatus comprising: a tub defining a fluid containment envelope; a drum positioned within the fluid containment envelope of the tub and rotatable relative to the tub about a primary rotation axis, the drum comprising a laundry-receiving portion for receiving one or more articles of laundry; a control unit; a motor coupled to the tub, wherein the motor is communicatively coupled to the control unit and operatively coupled to the drum to cause rotation of the drum, wherein the motor is isolated from fluid within the fluid containment envelope; a dynamic balancing assembly communicatively coupled to the control unit, the dynamic balancing assembly comprising one or more counterweight devices configured to be orbited about the primary rotation axis to counteract a load imbalance in the drum; and one or more clocksprings communicatively coupling each of the one or more counterweight devices to the control unit.

9. The laundry apparatus of clause 8, wherein the dynamic balancing assembly further comprises an orbital balancing passage arranged concentrically around the motor, the orbital balancing passage comprising: a first orbital chamber defining a passage within which the one or more counterweight devices are moveably positioned; and a clockspring chamber open to the first orbital chamber and housing the one or more clocksprings.

10. The laundry apparatus of clause 9, wherein the clockspring chamber is positioned radially inward from the first orbital chamber; and the one or more clocksprings are positioned radially inward of the one or more counterweight devices.

11. The laundry apparatus of any of clauses 8-10, wherein the first and second clocksprings are axially displaced along the primary rotation axis to allow independent orbital motion of the first and second clocksprings.

12. The laundry apparatus of any of clauses 8-11, wherein the dynamic balancing assembly further comprises: one or more load imbalance sensors communicatively coupled to the control unit and configured to output a load imbalance signal to the control unit, the load imbalance signal being indicative of the load imbalance within the drum; an orbital balancing passage arranged concentrically around the motor; a first counterweight device positioned within the orbital balancing passage and responsive to the control unit, wherein the control unit controllably moves the first counterweight device along the orbital balancing passage to adjust an angular position of the first counterweight device around the primary rotation axis to counteract a detected load imbalance in the drum; and a second counterweight device positioned within the orbital balancing passage and responsive to the control unit, wherein the control unit controllably moves the second counterweight device along the orbital balancing passage to adjust an angular position of the second counterweight device around the primary rotation axis to counteract the detected load imbalance in the drum, and wherein the one or more clocksprings comprise a first clockspring communicatively coupling the first counterweight device to the control unit and a second clockspring communicatively coupling the second counterweight device to the control unit.

13. The laundry apparatus of any of clauses 8-12, wherein the one or more clocksprings accommodate angular travel of the one or more counterweight devices for one or more revolutions around the primary rotation axis.

14. The laundry apparatus of any of clauses 8-13, further comprising a rotational commutation device for communicatively coupling the one or more clocksprings to the control unit, wherein the rotational commutation device comprises a rotating end connected to lead wires from the one or more clocksprings and a non-rotating end coupled to the control unit through lead wires extending from the non-rotating end to the control unit.

15. The laundry apparatus of any of clauses 8-14, wherein a cross-sectional plane passing through the laundry apparatus at a position orthogonal to the primary rotation axis passes through the dynamic balancing assembly, the one or more clocksprings, the motor, and the fluid containment envelope of the tub.

16. A laundry apparatus comprising: a tub comprising a fluid containment envelope and a motor receiving envelope that extends into a volume of the fluid containment envelope and is isolated from fluid received in the fluid containment envelope; a drum positioned within the fluid containment envelope of the tub and rotatable relative to the tub about a primary rotation axis centrally positioned in the tub, the drum comprising a laundry-receiving portion for receiving one or more articles of laundry; a control unit; a motor positioned within the motor receiving envelope such that the motor is positioned within the volume of the fluid containment envelope and isolated from the fluid received in the fluid containment envelope, wherein the motor is communicatively coupled to the control unit and operatively coupled to the drum to cause rotation of the drum; one or more load imbalance sensors communicatively coupled to the control unit and configured to output a load imbalance signal to the control unit, the load imbalance signal being indicative of a load imbalance within the drum; and a dynamic balancing assembly communicatively coupled to the control unit and attached to the drum within the fluid containment envelope, the dynamic balancing assembly comprising: an orbital balancing passage arranged concentrically around the motor; a first counterweight device positioned within the orbital balancing passage and responsive to the control unit, wherein the control unit controllably moves the first counterweight device along the orbital balancing passage to adjust an angular position of the first counterweight device around the primary rotation axis to counteract a detected load imbalance in the drum; a first clockspring communicatively coupling the first counterweight device to the control unit; a second counterweight device positioned within the orbital balancing passage and responsive to the control unit, wherein the control unit controllably moves the second counterweight device along the orbital balancing passage to adjust an angular position of the second counterweight device around the primary rotation axis to counteract the detected load imbalance in the drum; and a second clockspring communicatively coupling the second counterweight device to the control unit.

17. The laundry apparatus of clause 16, wherein the orbital balancing passage comprises: a first orbital chamber defining a passage within which the first and second counterweight devices are moveably positioned; and a clockspring chamber open to the first orbital chamber and housing the first and second clocksprings.

18. The laundry apparatus of clause 17, wherein the clockspring chamber is positioned radially inward from the first orbital chamber.

19. The laundry apparatus of any of clauses 16-18, wherein the first and second clocksprings are positioned radially inward of the first and second counterweight devices.

20. The laundry apparatus of any of clauses 16-19, further comprising a rotational commutation device for communicatively coupling the first and second clocksprings to the control unit, wherein the rotational commutation device comprises a rotating end connected to lead wires from the first and second clocksprings and a non-rotating end coupled to the control unit through lead wires extending from the non-rotating end to the control unit.

It should now be understood that embodiments described herein are generally directed to a laundry apparatuses that include dynamic balancing assemblies that maximize volumetric space for receiving laundry. For example, and as illustrated in the figures, a laundry apparatus according to the present disclosure generally includes a tub, a drum, and a dynamic balancing assembly. The drum is positioned within a fluid containment envelope of the tub and is rotatable relative to the tub about a primary rotation axis 102 102, the drum defines a laundry-receiving portion for receiving one or more articles of laundry. The dynamic balancing assembly includes an orbital balancing passage, arranged concentrically around a motor of the laundry apparatus, and first and second counterweight devices are positioned within the orbital balancing passage. The dynamic balancing assembly is positioned relative to the tub and/or drum so that a common cross-sectional plane passes through the dynamic balancing assembly, the motor, and the fluid containment envelope of the tub.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

What is claimed is:

1. A dynamic balancing assembly for a laundry apparatus, the dynamic balancing assembly comprising:
   a control unit;
   one or more counterweight devices configured to be orbited about a primary rotation axis of the laundry apparatus to counteract a load imbalance in a drum of the laundry apparatus;
   one or more clocksprings communicatively coupling each of the one or more counterweight devices to the control unit; and
an orbital balancing passage arranged concentrically around the primary rotation axis of the laundry apparatus, the orbital balancing passage comprising:
   a first orbital chamber defining a passage within which the one or more counterweight devices are moveably positioned; and
   a clockspring chamber open to the first orbital chamber and housing the one or more clocksprings.

2. The dynamic balancing assembly of claim 1, wherein the clockspring chamber is positioned radially inward from the first orbital chamber.

3. The dynamic balancing assembly of claim 1, wherein the one or more clocksprings are positioned radially inward of the one or more counterweight devices.

4. The dynamic balancing assembly of claim 1, further comprising:
   one or more load imbalance sensors communicatively coupled to the control unit and configured to output a load imbalance signal to the control unit, the load imbalance signal being indicative of the load imbalance within the drum of the laundry apparatus;
   a first counterweight device positioned within the orbital balancing passage and responsive to the control unit, wherein the control unit controllably moves the first counterweight device along the orbital balancing passage to adjust an angular position of the first counterweight device around the primary rotation axis to counteract a detected load imbalance in the drum; and
   a second counterweight device positioned within the orbital balancing passage and responsive to the control unit, wherein the control unit controllably moves the second counterweight device along the orbital balancing passage to adjust an angular position of the second counterweight device around the primary rotation axis to counteract the detected load imbalance in the drum, and
   wherein the one or more clocksprings comprise a first clockspring communicatively coupling the first counterweight device to the control unit and a second clockspring communicatively coupling the second counterweight device to the control unit.

5. The dynamic balancing assembly of claim 1, wherein the one or more clocksprings accommodate angular travel of the one or more counterweight devices for one or more revolutions around the primary rotation axis.

6. The dynamic balancing assembly of claim 1, further comprising a rotational commutation device for communicatively coupling the one or more clocksprings to the control unit, wherein the rotational commutation device comprises a rotating end connected to lead wires from the one or more clocksprings and a non-rotating end coupled to the control unit through lead wires extending from the non-rotating end to the control unit.

7. A laundry apparatus comprising:
   a tub defining a fluid containment envelope;
   a drum positioned within the fluid containment envelope of the tub and rotatable relative to the tub about a primary rotation axis, the drum comprising a laundry-receiving portion for receiving one or more articles of laundry;
   a control unit;
   a motor coupled to the tub, wherein the motor is communicatively coupled to the control unit and operatively coupled to the drum to cause rotation of the drum, wherein the motor is isolated from fluid within the fluid containment envelope;
   a dynamic balancing assembly communicatively coupled to the control unit, the dynamic balancing assembly comprising one or more counterweight devices configured to be orbited about the primary rotation axis to counteract a load imbalance in the drum; and
   one or more clocksprings communicatively coupling each of the one or more counterweight devices to the control unit; and
an orbital balancing passage arranged concentrically around the motor, the orbital balancing passage comprising:
   a first orbital chamber defining a passage within which the one or more counterweight devices are moveably positioned; and
   a clockspring chamber open to the first orbital chamber and housing the one or more clocksprings.

8. The laundry apparatus of claim 7, wherein:
   the clockspring chamber is positioned radially inward from the first orbital chamber; and
   the one or more clocksprings are positioned radially inward of the one or more counterweight devices.

9. The laundry apparatus of claim 7, wherein the apparatus comprises first and second clocksprings that are axially displaced along the primary rotation axis to allow independent orbital motion of the first and second clocksprings.

10. The laundry apparatus of claim 7, wherein the dynamic balancing assembly further comprises:
- one or more load imbalance sensors communicatively coupled to the control unit and configured to output a load imbalance signal to the control unit, the load imbalance signal being indicative of the load imbalance within the drum;
- a first counterweight device positioned within the orbital balancing passage and responsive to the control unit, wherein the control unit controllably moves the first counterweight device along the orbital balancing passage to adjust an angular position of the first counterweight device around the primary rotation axis to counteract a detected load imbalance in the drum; and
- a second counterweight device positioned within the orbital balancing passage and responsive to the control unit, wherein the control unit controllably moves the second counterweight device along the orbital balancing passage to adjust an angular position of the second counterweight device around the primary rotation axis to counteract the detected load imbalance in the drum, and
- wherein the one or more clocksprings comprise a first clockspring communicatively coupling the first counterweight device to the control unit and a second clockspring communicatively coupling the second counterweight device to the control unit.

11. The laundry apparatus of claim 7, wherein the one or more clocksprings accommodate angular travel of the one or more counterweight devices for one or more revolutions around the primary rotation axis.

12. The laundry apparatus of claim 7, further comprising a rotational commutation device for communicatively coupling the one or more clocksprings to the control unit, wherein the rotational commutation device comprises a rotating end connected to lead wires from the one or more clocksprings and a non-rotating end coupled to the control unit through lead wires extending from the non-rotating end to the control unit.

13. The laundry apparatus of claim 7, wherein a cross-sectional plane passing through the laundry apparatus at a position orthogonal to the primary rotation axis passes through the dynamic balancing assembly, the one or more clocksprings, the motor, and the fluid containment envelope of the tub.

14. A laundry apparatus comprising:
- a tub comprising a fluid containment envelope and a motor receiving envelope that extends into a volume of the fluid containment envelope and is isolated from fluid received in the fluid containment envelope;
- a drum positioned within the fluid containment envelope of the tub and rotatable relative to the tub about a primary rotation axis centrally positioned in the tub, the drum comprising a laundry-receiving portion for receiving one or more articles of laundry;
- a control unit;
- a motor positioned within the motor receiving envelope such that the motor is positioned within the volume of the fluid containment envelope and isolated from the fluid received in the fluid containment envelope, wherein the motor is communicatively coupled to the control unit and operatively coupled to the drum to cause rotation of the drum;
- one or more load imbalance sensors communicatively coupled to the control unit and configured to output a load imbalance signal to the control unit, the load imbalance signal being indicative of a load imbalance within the drum; and
- a dynamic balancing assembly communicatively coupled to the control unit and attached to the drum within the fluid containment envelope, the dynamic balancing assembly comprising:
  - an orbital balancing passage arranged concentrically around the motor;
  - a first counterweight device positioned within the orbital balancing passage and responsive to the control unit, wherein the control unit controllably moves the first counterweight device along the orbital balancing passage to adjust an angular position of the first counterweight device around the primary rotation axis to counteract a detected load imbalance in the drum;
  - a first clockspring communicatively coupling the first counterweight device to the control unit;
  - a second counterweight device positioned within the orbital balancing passage and responsive to the control unit, wherein the control unit controllably moves the second counterweight device along the orbital balancing passage to adjust an angular position of the second counterweight device around the primary rotation axis to counteract the detected load imbalance in the drum; and
  - a second clockspring communicatively coupling the second counterweight device to the control unit;
- wherein the orbital balancing passage comprises:
  - a first orbital chamber defining a passage within which the first and second counterweight devices are moveably positioned; and
  - a clockspring chamber open to the first orbital chamber and housing the first and second clocksprings.

15. The laundry apparatus of claim 14, wherein the clockspring chamber is positioned radially inward from the first orbital chamber.

16. The laundry apparatus of claim 14, wherein the first and second clocksprings are positioned radially inward of the first and second counterweight devices.

17. The laundry apparatus of claim 14, further comprising a rotational commutation device for communicatively coupling the first and second clocksprings to the control unit, wherein the rotational commutation device comprises a rotating end connected to lead wires from the first and second clocksprings and a non-rotating end coupled to the control unit through lead wires extending from the non-rotating end to the control unit.

* * * * *